US008767045B2

(12) United States Patent
Kitazato et al.

(10) Patent No.: US 8,767,045 B2
(45) Date of Patent: Jul. 1, 2014

(54) APPARATUS AND METHOD OF TRANSMITTING STEREOSCOPIC IMAGE DATA AND APPARATUS AND METHOD OF RECEIVING STEREOSCOPIC IMAGE DATA

(75) Inventors: Naohisa Kitazato, Tokyo (JP); Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 349 days.

(21) Appl. No.: 13/066,689

(22) Filed: Apr. 21, 2011

(65) Prior Publication Data
US 2011/0273532 A1   Nov. 10, 2011

(30) Foreign Application Priority Data
May 10, 2010   (JP) .............................. P2010-108817

(51) Int. Cl.
*H04N 13/00* (2006.01)
*G06K 9/00* (2006.01)

(52) U.S. Cl.
USPC .......................................... 348/43; 382/154

(58) Field of Classification Search
CPC .......... H04N 13/0239; H04N 13/0055; H04N 13/0007; H04N 2213/005; G06T 7/0075
USPC ...................................... 348/42–47; 382/154
See application file for complete search history.

(56) References Cited

U.S. PATENT DOCUMENTS

| 2007/0296721 | A1* | 12/2007 | Chang et al. .................. 345/427 |
| 2009/0324202 | A1 | 12/2009 | Okubo et al. |
| 2011/0119709 | A1* | 5/2011 | Kim et al. ...................... 725/39 |
| 2011/0242104 | A1* | 10/2011 | Zhang et al. ................... 345/419 |
| 2011/0273530 | A1* | 11/2011 | Suh et al. ........................ 348/42 |

FOREIGN PATENT DOCUMENTS

| JP | 2005-006114 A | 1/2005 |
| WO | 2010010499 A1 | 1/2010 |

OTHER PUBLICATIONS

European Search Report from EP Application No. 11164541, dated Feb. 12, 2013.

* cited by examiner

*Primary Examiner* — Dave Czekaj
*Assistant Examiner* — Tsion B Owens
(74) *Attorney, Agent, or Firm* — Lerner, David, Littenberg, Krumholz & Mentlik, LLP

(57) ABSTRACT

An apparatus of transmitting stereoscopic image data includes an image data output unit configured to output stereoscopic image data including left-eye image data and right-eye image data about a certain program; and an image data transmitting unit configured to transmit a transport stream including the stereoscopic image data about the certain program output from the image data output unit. The image data transmitting unit incorporates identification information indicating whether disparity data is transmitted in the transport stream. The disparity data is used to add disparity to superimposed information to be superimposed on an image generated from the left-eye image data and the right-eye image data.

15 Claims, 30 Drawing Sheets

FIG. 5

| | |
|---|---|
| Stereoscopic_descriptor() { | |
|     descriptor_tag | 8 |
|     descriptor_length | 8 |
|     3D_format_type | 4 |
|     2D_display_view | 1 |
|     reserved | 1 |
|     simulcast_condition | 2 |
|     detailed_disparity_supply | 1 |
|     event_disparity_supply | 1 |
|     reserved | 4 |
|     select_view_shift | 2 |
|     disparity_value | 8 |
| } | |

FIG. 6

- 3D_format_type : indicates 3D format type
  - '3' for Side By Side
  - '4' for Top & Bottom
  - '7' for Full resolution stereo
- 2D_display_view: indicates which view should be displayed at 2D display mode
  - 0:L,
  - 1:R
- Simulcast_condition: indicates 2D/3D simulcast condition
  - 0: non-simulcast
  - 1: simul-ES ( same service) →refer component descriptor
  - 2: simul-event (another service) → refer linkage descriptor
  - 3: reserved for the future simulcast solution
    →refer another new descriptor
- Detailed_disparity_supply: indicates whether detailed disparity data as described by disparity_linkage_descriptor is supplied, or not
  - 1: supplied,
  - 0: not supplied
- Event_disparity_supply : indicates where or not fixed disparity data for this event is supplied
  - 1: supplied
  - 0: not supplied
- Select_view_shift : refer to disparity stream semantics
  (Only in case of event_disparity_supply=1,it is valid)
- Disparity_value: Refer to disparity stream semantics
  (Only in case of event_disparity_supply=1,it is valid)

FIG. 7

```
Disparity_link_descriptor() {
    descriptor_tag                8
    descriptor_length             8
    disparity_component           8
    subtitle_disparity_flag       1
    general_use_disparity_flag    1
    reserved_for_future_use       6
}
```

FIG. 8

- Disparity_component: indicates value of comment tag indicating disparity stream including disparity data
  →Acquire PID of disparity stream corresponding to value of comment tag from stream_identifier_descriptor arranged in ES loop in PMT
- Subtitle_disparity_flag: indicates whether subtitle disparity data is set
  1: set  0: not set
- General_use_disparity_flag: indicates whether general-purpose disparity data exists
  1: exists  0: not exist
- Reserved_for_future_use: reserved area
  will be used as flag data area if broadcast data (for example, data broadcast) for which disparity data is used appears FIG. 13    DVB_Subtitling    (ETSI EN 300 743)

| SYNTAX | NO. OF BITS | FORMAT |
|---|---|---|
| PES_data_field() { | | |
| data_identifier | 8 | bslbf |
| subtitle_stream_id | 8 | bslbf |
| while nextbits() == '0000 1111' { | 16 | bslbf |
| subtitling_segment() | 16 | uimsbf |
| } | | |
| end_of_PES_data_field_marker | 8 | bslbf |
| } | | |
| | | |
| Subtitling_segment() { | | |
| sync_byte | 8 | bslbf |
| segment_type | 8 | bslbf |
| page_id · | 16 | bslbf |
| segment_length | 16 | uimsbf |
| segment_data_field() | | |
| } | | |

FIG. 14

DVB subtitles segment_type

| DVB SUBTITLES segment_type | SEGMENT |
|---|---|
| 0x10 | page composition segment |
| 0x11 | region composition segment |
| 0x12 | CLUT definition segment |
| 0x13 | object data segment |
| 0x14 | display definition segment |
| 0x40 | 3D segment (new definition) |
| 0x41 – 0x7F | reserved for future use |
| 0x80 | end of display set segment |
| 0x81 – 0xEF | private data |
| 0xFF | stuffing (see note) |
| All other values | reserved for future use |

FIG. 15

```
3D_segment() {
    sync_byte                              8
    segment_type                           8
    page_id                                16
    segment_length                         16
    disparity_static_supply                1
    disparity_sequence_supply              1
    reserved                               4
    select_view_shift                      2
    number_of_regions                      8
    for(j=0;i<number_of_regeons;i++){
        region_id                          8
        if(disparity_static_supply){
            disparity_value                8
        }
        if(disparity_sequence_supply){
            disparity_sequence_id          8
        }
    }
}
```

FIG. 16

- Disparity_static_supply: indicates whether value of fixed disparity data is supplied in units of regions/display sets
  1: supplied  0: not supplied
- Disparity_sequence_supply: indicates whether disparity sequence indicating variation with time of value of disparity data is supplied in units of regions/display sets
  1: supplied  0: not supplied
- Select_view_shift: specifies target view to be shifted. Refer to the same item in semantics of disparity stream.
- Disparity_value: indicates value of disparity data. Refer to the same item in semantics in disparity stream.
- Disparity_sequence_id: specifies specific disparity sequence on disparity stream

FIG. 17

| SYNTAX | NO. OF BITS | FORMAT |
|---|---|---|
| PES_data_field() { | | |
|   data_identifier | 8 | bslbf |
|   disparity_stream_id | 8 | bslbf |
|   while nextbits() == '********' { | | |
|     disparity_data_set() | | |
|   } | | |
|   end_of_PES_data_field_marker | 8 | bslbf |
| } | | |

FIG. 18

| SYNTAX | NO. OF BITS |
|---|---|
| disparity_data_set() { | |
|   sync_byte | 8 |
|   disparity_sequence_id | 8 |
|   select_view_shift | 2 |
|   reserved | 6 |
|   frame_count | 8 |
|   for( i=0;i<frame_count;i++){ | |
|     disparity_value | 8 |
|   } | |
| } | |

FIG. 19

Disparity_sequence_id (8 bit)
  Specifying identifier of disparity_sequnce

Select_view_shift (2 bits)
  Specifying the target view to be shifted
  "00" = Reserved
  "01" = Shift left view: Left view is shifted by the amount given in disparity[i]
         (left for negative values, right for positive values). Right view is not shifted.
  "10" = Shift right view: Right view is shifted by the amount given in disparity[i]
         (left for negative values, right for positive values). Left view is not shifted.
  "11" = Shift both views (in opposite directions):
           For even values of disparity[i]:
             Left view is shifted by (disparity[i]/2)
               (left for negative values, right for positive values)
             Right view is shifted in the opposite direction by (disparity[i]/2)
           For odd values of disparity[i]:
             Left view is shifted by ((disparity[i]+1)/2)
               (left for negative values, right for positive values)
             Right view is shifted in the opposite direction by ((disparity[i]-1)/2)

Disparity_value (8 bits)
  Specifying a signed integer pixel precision value [-128..127].
  Positive value describes the 3D depth farther than screen position, while negative value
  describes the 3D depth closer than screen position.

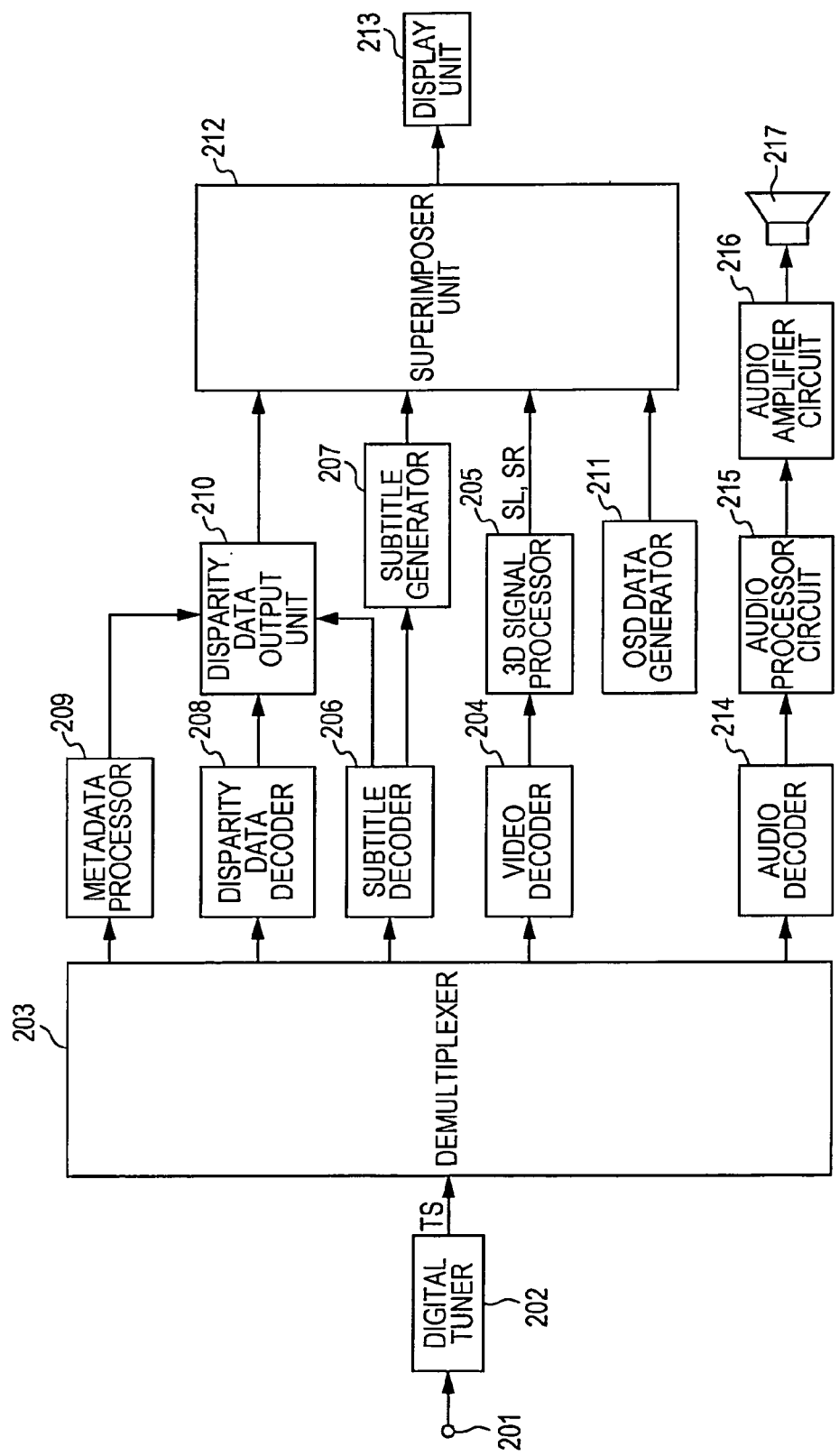

APPARATUS AND METHOD OF TRANSMITTING STEREOSCOPIC IMAGE DATA AND APPARATUS AND METHOD OF RECEIVING STEREOSCOPIC IMAGE DATA

CROSS-REFERENCE TO RELATED APPLICATION

The present application claims priority from Japanese Patent Application No. JP 2010-108817 filed in the Japanese Patent Office on May 10, 2010, the entire content of which is incorporated herein by reference.

BACKGROUND OF THE INVENTION

1. Field of the Invention

The present invention relates to an apparatus and a method of transmitting stereoscopic image data and an apparatus and a method of receiving stereoscopic image data. More particularly, the present invention relates to an apparatus and a method of transmitting stereoscopic image data and an apparatus and a method of receiving stereoscopic image data capable of improving the flexibility of transmission of disparity data by 3D video content suppliers.

2. Description of the Related Art

For example, Japanese Unexamined Patent Application Publication No. 2005-6114 discloses a method of transmitting stereoscopic image data using television airwaves. In this transmission method, the stereoscopic image data including left-eye image data and right-eye image data is transmitted to a television receiver that displays a stereoscopic image using binocular disparity.

FIG. 30 illustrates examples of the relationship between positions where left and right images of objects are displayed on a screen and positions where stereoscopic images (three-dimensional (3D) images) of the objects are reproduced in the display of the stereoscopic images using the binocular disparity. For example, in the case of an object A whose left image La is shifted rightward on the screen and whose right image Ra is shifted leftward on the screen, the stereoscopic image of the object A is displayed at a position closer than the screen because a left line of sight intersects with a right line of sight at the position closer than the screen. Dpa denotes a horizontal disparity vector concerning the object A.

In the case of an object B whose left image Lb and right image Rb are displayed at the same position, the stereoscopic image of the object B is displayed at a position on the screen because the left line of sight intersects with the right line of sight on the screen. In the case of an object C whose left image Lc is shifted leftward on the screen and whose right image Rc is shifted rightward on the screen, the stereoscopic image of the object C is displayed at a position farther than the screen because the left line of sight intersects with the right line of sight at the position farther than the screen. Dpc denotes a horizontal disparity vector concerning the object C.

SUMMARY OF THE INVENTION

In superimposition of superimposed information including captions, data broadcast display, and display specific to terminal applications on stereoscopic images (3D images) displayed in television receivers in the above manner, it is desirable to set appropriate depths at which viewers can easily view the stereoscopic images for the stereoscopic images. The appropriate depths are generally considered as depths closer than the depths of the stereoscopic images. FIG. 31 illustrates an example of the positional relationship between an image and a subtitle (caption). In this example, the subtitle is recognized at a position closer than the closest position of the image.

Since two images generated from the views of left and right eyes are used in a typical existing 3D television system, the depth is represented by the number of pixels of a horizontal shift between left and right images on a target where the images are displayed. Accordingly, also on the superimposed information such as captions superimposed on the images, it is considered that an appropriate depth is defined on the basis of the number of pixels of the horizontal shift between left and right images for every piece of superimposed information. Information about the number of pixel of the shift is called disparity data.

In 3D movies, the depths of captions superimposed on images are often varied with time in response to variation in the images (videos) with time. In order to provide similar display also in 3D television systems, it is considered that the depths are desirably constantly varied for each caption. However, much effort is expended to generate the disparity data that is constantly varied for each caption, thus increasing the production cost. In addition, it is necessary to make new investments in facilities that generate desired disparity data to distribute the disparity data.

Various 3D content items will be produced to distribute the 3D content items by using broadcasts or Internet Protocol Televisions (IPTVs). However, content suppliers may not necessarily consider that the desired disparity data described above should be supplied to achieve the easy viewing of the captions, which are considered to be less important than the images.

In such a case, in distribution of a certain 3D video content item, the content suppliers may display specific superimposed information such as a caption at a fixed depth during the period in which the superimposed information is displayed. In distribution of another 3D video content item, the content suppliers may display the entire program (content) at a fixed depth.

In distribution of another 3D video content item, the content suppliers may not consider display of the superimposed information as 3D videos although the content suppliers transmit the superimposed information such as captions in a manner similar to the one in two-dimensional (2D) video content items. In this case, no disparity data is supplied. In distribution of another 3D video content item, the content suppliers may constantly add desired disparity data to the 3D video content item.

There is no solution in related art to the various demands from the content suppliers concerning the superimposed information such as captions in the broadcasts or the IPTVs considering 3D video content items.

It is desirable to improve the flexibility of transmission of the disparity data by 3D video content suppliers.

According to an embodiment of the present invention, an apparatus of transmitting stereoscopic image data includes an image data output unit configured to output stereoscopic image data including left-eye image data and right-eye image data about a certain program; and an image data transmitting unit configured to transmit a transport stream including the stereoscopic image data about the certain program output from the image data output unit. The image data transmitting unit incorporates identification information indicating whether disparity data is transmitted in the transport stream. The disparity data is used to add disparity to superimposed information to be superimposed on an image generated from the left-eye image data and the right-eye image data.

In the above embodiment, the image data output unit outputs the stereoscopic image data including the left-eye image data and the right-eye image data about a certain program. The image data transmitting unit transmits the transport stream including the stereoscopic image data about the certain program output from the image data output unit. The image data transmitting unit incorporates the identification information indicating whether the disparity data is transmitted in the transport stream. The disparity data is used to add the disparity to the superimposed information to be superimposed on an image generated from the left-eye image data and the right-eye image data.

The superimposed information means information to be superimposed on images, such as subtitle information used for display of a caption, closed-caption information, graphics information for display of a graphic, such as a logo, an electronic program guide (EPG), text information for display of the content of teletext broadcasting or the like, and on-screen display specific to television receivers.

For example, the identification information may indicate whether disparity data for every program is transmitted. When the identification information indicates that the disparity data for every program is transmitted, the image data transmitting unit preferably further incorporates the disparity data for every program in the transport stream.

In this case, the image data transmitting unit preferably incorporates the identification information and the disparity data in the transport stream as metadata for every program. For example, the transport stream preferably includes an event information table used as serviced information for management in units of programs, and the image data transmitting unit preferably incorporates the identification information and the disparity data in the event information table.

For example, the identification information may indicate whether general-purpose disparity data is transmitted. When the identification information indicates that the general-purpose disparity data is transmitted, the image data transmitting unit preferably further incorporates a disparity elementary stream including the general-purpose disparity data in the transport stream and preferably incorporates identification information identifying the disparity elementary stream in the transport stream in association with the identification information indicating that the general-purpose disparity data is transmitted.

For example, the identification information may indicate whether disparity data for specific superimposed information is transmitted. When the identification information indicates that the disparity data for specific superimposed information is transmitted, the image data transmitting unit preferably further incorporates fixed-varied information in the transport stream. The fixed-varied information indicates either of transmission of disparity data that is commonly used in a frame period including frames of a certain number in which the specific superimposed information is displayed and transmission of disparity data that is sequentially updated in the frame period including frames of the certain number or both thereof. In this case, for example, the image data transmitting unit preferably incorporates a superimposed information elementary stream including data about the specific superimposed information in the transport stream, and the fixed-varied information is preferably incorporated in the superimposed information elementary stream for every piece of superimposed information.

When the fixed-varied information indicates the transmission of the disparity data that is commonly used in the frame period including frames of the certain number, the image data transmitting unit preferably incorporates the disparity data that is commonly used in the frame period including frames of the certain number in the superimposed information elementary stream for every piece of superimposed information in association with the fixed-varied information. When the fixed-varied information indicates the transmission of the disparity data that is sequentially updated in the frame period including frames of the certain number in which the specific superimposed information is displayed, the image data transmitting unit preferably incorporates the superimposed information elementary stream in which a disparity sequence for every piece of superimposed information is discriminated with the identification information in the transport stream and preferably incorporates the identification information specifying the corresponding disparity sequence in the disparity elementary stream in the superimposed information elementary stream for every piece of superimposed information in accordance with the fixed-varied information.

As described above, according to the above embodiment of the present invention, the identification information indicating whether the disparity data is transmitted is incorporated in the transport stream including the stereoscopic image data about a certain program. Accordingly, it is possible to improve the flexibility of the transmission of the disparity data by the 3D video content supplier. In other words, it is possible to selectively transmit the disparity data for every program, the general-purpose disparity data, the disparity data for specific superimposed information, and so on as the disparity data. In addition, no transmission of the disparity data may be selected.

According to another embodiment of the present invention, an apparatus of receiving stereoscopic image data includes an image data receiving unit configured to receive a transport stream in which stereoscopic image data including left-eye image data and right-eye image data about a certain program is included and in which identification information indicating whether disparity data is transmitted is incorporated, the disparity data being used to add disparity to superimposed information to be superimposed on an image generated from the left-eye image data and the right-eye image data; an image data acquiring unit configured to acquire the stereoscopic image data from the transport stream received by the image data receiving unit; an identification information acquiring unit configured to acquire the identification information from the transport stream received by the image data receiving unit; and an image data processing unit configured to add the disparity based on certain disparity data to the same superimposed information to be superimposed on an left-eye image and a right-eye image on the basis of the stereoscopic image data acquired by the image data acquiring unit and the identification information acquired by the identification information acquiring unit to acquire left-eye image data on which the superimposed information is superimposed and right-eye image data on which the superimposed information is superimposed.

In the above embodiment, the image data receiving unit receives the transport stream. The stereoscopic image data including the left-eye image data and the right-eye image data about a certain program is included in the transport stream. The identification information indicating whether the disparity data is transmitted is incorporated in the transport stream. The disparity data is used to add the disparity to the superimposed information to be superimposed on an image generated from the left-eye image data and the right-eye image data. The identification information may indicate whether disparity data for every program is transmitted, whether general-purpose disparity data is transmitted, or whether disparity data for specific superimposed information is transmitted.

The image data acquiring unit acquires the stereoscopic image data from the transport stream received by the image data receiving unit. The identification information acquiring unit acquires the identification information from the transport stream received by the image data receiving unit. The image data processing unit acquires the left-eye image data on which the superimposed information is superimposed and the right-eye image data on which the superimposed information is superimposed on the basis of the stereoscopic image data and the identification information. In this case, the disparity based on certain disparity data is added to the same superimposed information to be superimposed on the left-eye image and the right-eye image.

When the identification information indicates that the disparity data is transmitted, the disparity data acquired from the transport stream is preferably used as the certain disparity data. When the identification information indicates that no disparity data is transmitted, the disparity data that is prepared in advance is preferably used as the certain disparity data.

As described above, according to the above embodiment of the present invention, the identification information incorporated in the transport stream is acquired. The disparity based on the certain disparity data is added to the same superimposed information to be superimposed on the left-eye image and the right-eye image on the basis of the identification information. Accordingly, it is possible to display the superimposed information, such as a caption, on the stereoscopic image at a depth intended by the 3D video content supplier.

According to the present invention, the identification information indicating whether the disparity data is transmitted is incorporated in the transport stream including the stereoscopic image data about a certain program. Accordingly, it is possible to improve the flexibility of the transmission of the disparity data by the 3D video content supplier. In addition, it is possible to display the superimposed information, such as a caption, on the stereoscopic image at a depth intended by the 3D video content supplier.

BRIEF DESCRIPTION OF THE DRAWINGS

FIG. 5 shows an example of the syntax of a stereoscopic descriptor (stereoscopic_descriptor);

FIG. 6 shows the semantics of the stereoscopic descriptor (stereoscopic_descriptor);

FIG. 7 shows an example of the syntax of a disparity link descriptor (disparity_link_descriptor);

FIG. 8 shows the semantics of the disparity link descriptor (disparity_link_descriptor);

FIG. 13 shows the syntax of a subtitle stream (PES), that is, Digital Video Broadcasting (DVB)_Subtitling;

FIG. 14 shows the correspondence between each value of a segment "segment_type" and the segment type;

FIG. 15 shows an example of the syntax of a 3D segment (3DS);

FIG. 16 shows the semantics of the 3DS;

FIG. 17 shows an example of the syntax of a disparity stream, that is, shows an example of the syntax of "PES_data_field" including disparity data;

FIG. 18 shows an example of the syntax of "disparity_data_set";

FIG. 19 shows the main semantics of "disparity_data_set;

FIG. 20 is a block diagram showing an example of the configuration of a receiver apparatus in the stereoscopic image transmission-reception system;

DESCRIPTION OF THE PREFERRED EMBODIMENTS

Embodiments of the present invention will herein be described with reference to the attached drawings.

1. Embodiments

[Example of Configuration of Image Transmission-Reception System]

Figure 1:
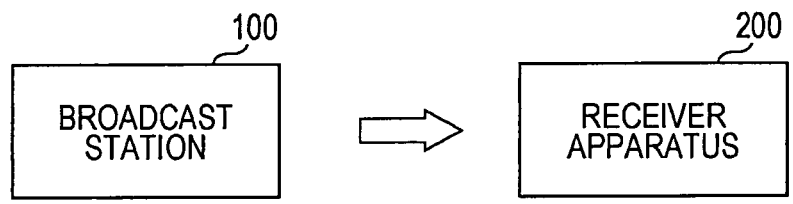
FIG. 1 illustrates an example of the configuration of an stereoscopic image transmission-reception system according to an embodiment of the present invention.

FIG. 1 illustrates an example of the configuration of a stereoscopic image transmission-reception system 10 according to an embodiment of the present invention. The stereoscopic image transmission-reception system 10 includes a broadcast station 100 and a receiver apparatus 200. The broadcast station 100 transmits a transport stream on airwaves. The transport stream includes stereoscopic image data including left-eye image data and right-eye image data about a certain program.

In addition, identification information indicating whether disparity data is transmitted is incorporated in the transport stream. The disparity data is used to shift superimposed information, such as a caption, to be superimposed on an image generated from the left-eye image data and the right-eye image data to add disparity. The disparity data is, for example, a disparity vector or depth data. The depth data can be processed as the disparity vector through certain conversion.

The receiver apparatus 200 receives the transport stream transmitted from the broadcast station 100 on the airwaves. The receiver apparatus 200 acquires the stereoscopic image data from the transport stream and also acquires the identification information from the transport stream. The receiver apparatus 200 acquires the left-eye image data on which the superimposed information, such as a caption, is superimposed and the right-eye image data on which the superimposed information is superimposed on the basis of the stereoscopic image data and the identification information.

[Description of Broadcast Station]

The broadcast station 100 will now be described in detail. The broadcast station 100 transmits the transport stream in which the stereoscopic image data is included and in which the identification information indicating whether the disparity data is transmitted is incorporated on airwaves, as described above. The transport stream includes, for example, audio data, subtitle data, and the disparity data, in addition to the stereoscopic image data, in the present embodiment. The disparity data is included in the transport stream only when the identification information indicates that the disparity data is transmitted.

[Example of Configuration of Transmission Data Generating Unit]

Figure 2:
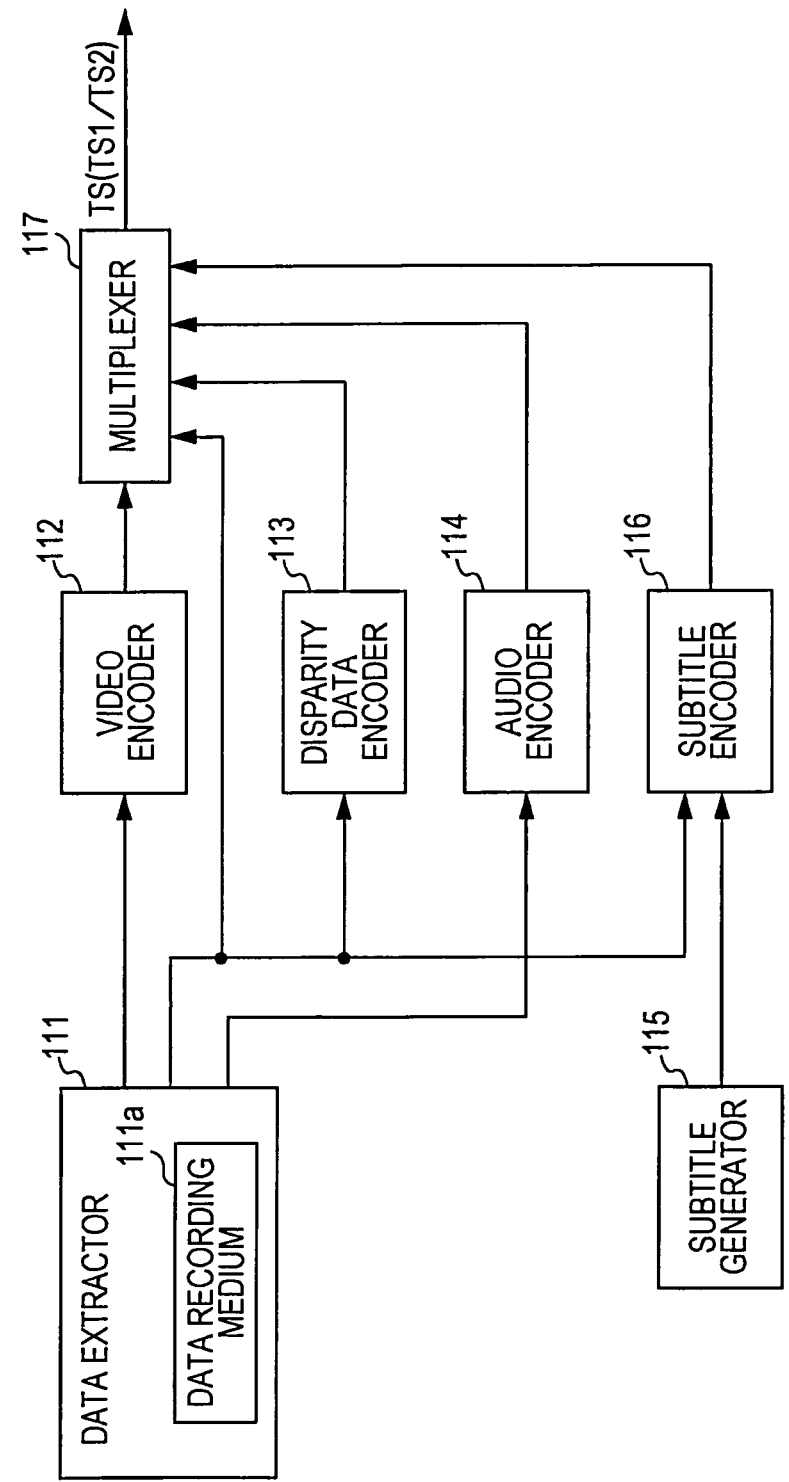
FIG. 2 is a block diagram showing an example of the configuration of a transmission data generating unit in a broadcast station.

FIG. 2 is a block diagram showing an example of the configuration of a transmission data generating unit 110 generating the transport stream in the broadcast station 100. The transmission data generating unit 110 includes a data extractor (archive) 111, a video encoder 112, a disparity data encoder 113, and an audio encoder 114. The transmission data generating unit 110 also includes a subtitle generator 115, a subtitle encoder 116, and a multiplexer 117.

A data recording medium 111a is, for example, detachably loaded in the data extractor 111. The stereoscopic image data about a certain program transmitted on the transport stream and the audio data corresponding to the stereoscopic image data are recorded on the data recording medium 111a. The stereoscopic image data includes the left-eye image data and the right-eye image data.

The disparity data may be recorded on the data recording medium 111a in association with the stereoscopic image data about the certain program. When the disparity data is recorded on the data recording medium 111a, the disparity data can be incorporated in the transport stream to transmit the disparity data in association with the stereoscopic image data about the certain program.

The disparity data recorded on the data recording medium 111a is, for example, disparity data for every program, general-purpose disparity data, and specific-purpose disparity data (disparity data for specific superimposed information). The specific-purpose disparity data includes, for example, subtitle disparity data and closed-caption disparity data. The subtitle disparity data is used in the present embodiment. In the case of the disparity data for every program, one piece of disparity data is recorded on the data recording medium 111a in association with the stereoscopic image data about the certain program.

In the case of the general-purpose disparity data, for example, the disparity data belonging to each divided area resulting from division of the screen into a certain number of areas is recorded on the data recording medium 111a in association with the stereoscopic image data about the certain program. In this case, for example, one piece of disparity data for every program belongs to each divided area or multiple pieces of disparity data for every frames of a certain number belong to each divided area.

In the case of the specific-purpose disparity data, the disparity data about each region in each page is recorded on the data recording medium 111a in units of display sets in association with the stereoscopic image data about the certain program. In this case, for example, one piece of disparity data commonly used in a frame period including frames of a certain number composing the display set is recorded for each region or multiple pieces of disparity data sequentially updated in the frame period including frames of the certain number are recorded for each region.

The data recording medium 111a in the data extractor 111 is, for example, a disk recording medium or a semiconductor memory. The data extractor 111 extracts the stereoscopic image data about the certain program from the data recording medium 111a and also extracts the audio data and the disparity data recorded in association with the stereoscopic image data to output the stereoscopic image data, the audio data, and the disparity data.

The video encoder 112 performs encoding, such as MPEG4-AVC or MPEG2, to the image data supplied from the data extractor 111 to acquire encoded video data. In addition, the video encoder 112 generates a video elementary stream including the stereoscopic image data with a downstream stream formatter (not shown).

The disparity data encoder 113 generates a disparity elementary stream including the disparity data supplied from the data extractor 111. The disparity data encoder 113 generates the disparity elementary stream when the disparity data is the general-purpose disparity data. The disparity data encoder 113 generates the disparity elementary stream when the disparity data is the specific-purpose disparity data and multiple pieces of disparity data sequentially updated in the frame period including frames of the certain number are recorded for each region.

In other words, the disparity data encoder 113 does not generate the disparity elementary stream when the disparity data is the disparity data for every program. The disparity data for every program is described in a stereoscopic descriptor (stereoscopic_descriptor) incorporated in an event information table (EIT) in the multiplexer 117, as described in detail below.

The disparity data encoder 113 does not generate the disparity elementary stream when the disparity data is the specific-purpose disparity data and one piece of disparity data commonly used in the frame period including frames of the certain number is recorded for each region. The disparity data for each region is incorporated in a subtitle elementary stream generated in the subtitle encoder 116 in association with the subtitle data about each region, as described in detail below.

The audio encoder 114 performs encoding, such as MPEG-2Audio AAC, to the audio data supplied from the data extractor 111 to generate an audio elementary stream. The subtitle generator 115 generates data on a subtitle to be superimposed on an image (subtitle data). The subtitle is, for example, a caption. The subtitle encoder 116 generates the subtitle elementary stream including the subtitle data generated in the subtitle generator 115.

Figure 3:
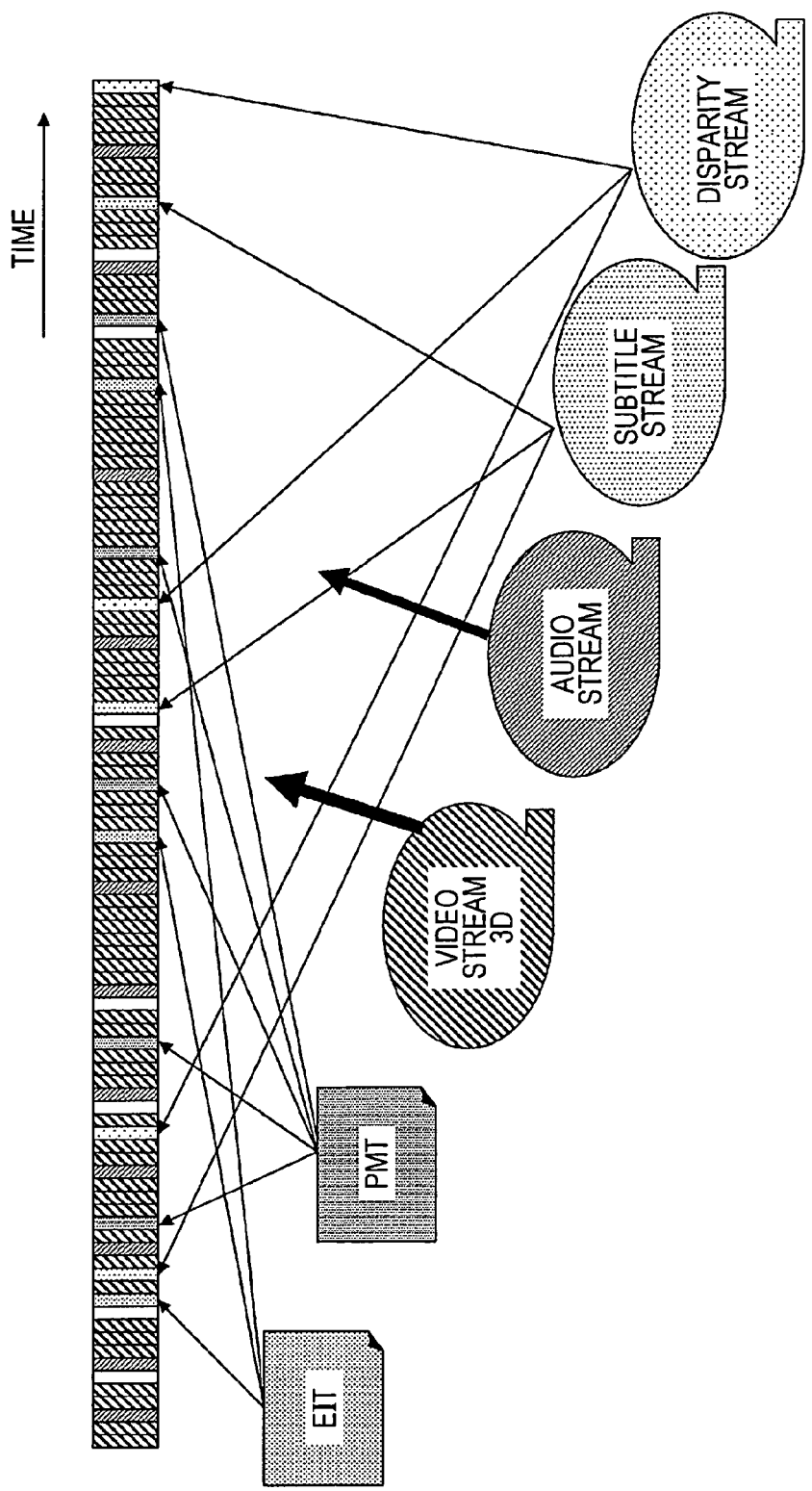
FIG. 3 shows an example of the structure of a transport stream including video PES packets, audio PES packets, subtitle PES packets, disparity PES packets, and tables such as event information tables (EITs) and program map tables (PMTs)

The multiplexer 117 packetizes the elementary streams generated in the video encoder 112, the disparity data encoder 113, the audio encoder 114, and the subtitle encoder 116 for multiplexing to generate a transport stream TS. FIG. 3 shows an example of the structure of the transport stream TS. The transport stream TS includes packets (packetized elementary stream (PES) packets) resulting from the packetization of each elementary stream in time division.

The transport stream TS includes intermittent event information tables (EITs) used as serviced information (SI) for management in units of events. The transport stream TS also includes intermittent program map tables (PMTs) used as program specific information (PSI). The PSI indicates which program each elementary stream included in the transport stream belongs to.

[Incorporation of Identification Information]

The multiplexer 117 incorporates the identification information indicating whether the disparity data is transmitted in the transport stream TS. In the present embodiment, the stereoscopic descriptor (stereoscopic_descriptor) and a disparity link descriptor (disparity_link_descriptor) are newly defined to incorporate the identification information. The stereoscopic descriptor includes the identification information indicating whether the disparity data for every program is transmitted. The multiplexer 117 incorporates the stereoscopic descriptor in the transport stream TS as metadata for every program. In the present embodiment, the multiplexer 117 incorporates the stereoscopic descriptor in the above-mentioned EIT.

The disparity link descriptor includes the identification information indicating whether the general-purpose disparity data is transmitted. The disparity link descriptor also includes the identification information indicating whether the specific-purpose disparity data is transmitted. The multiplexer 117 incorporates the disparity link descriptor in the transport stream TS, if necessary. In the present embodiment, the multiplexer 117 incorporates the disparity link descriptor in the EIT.

Figure 4:
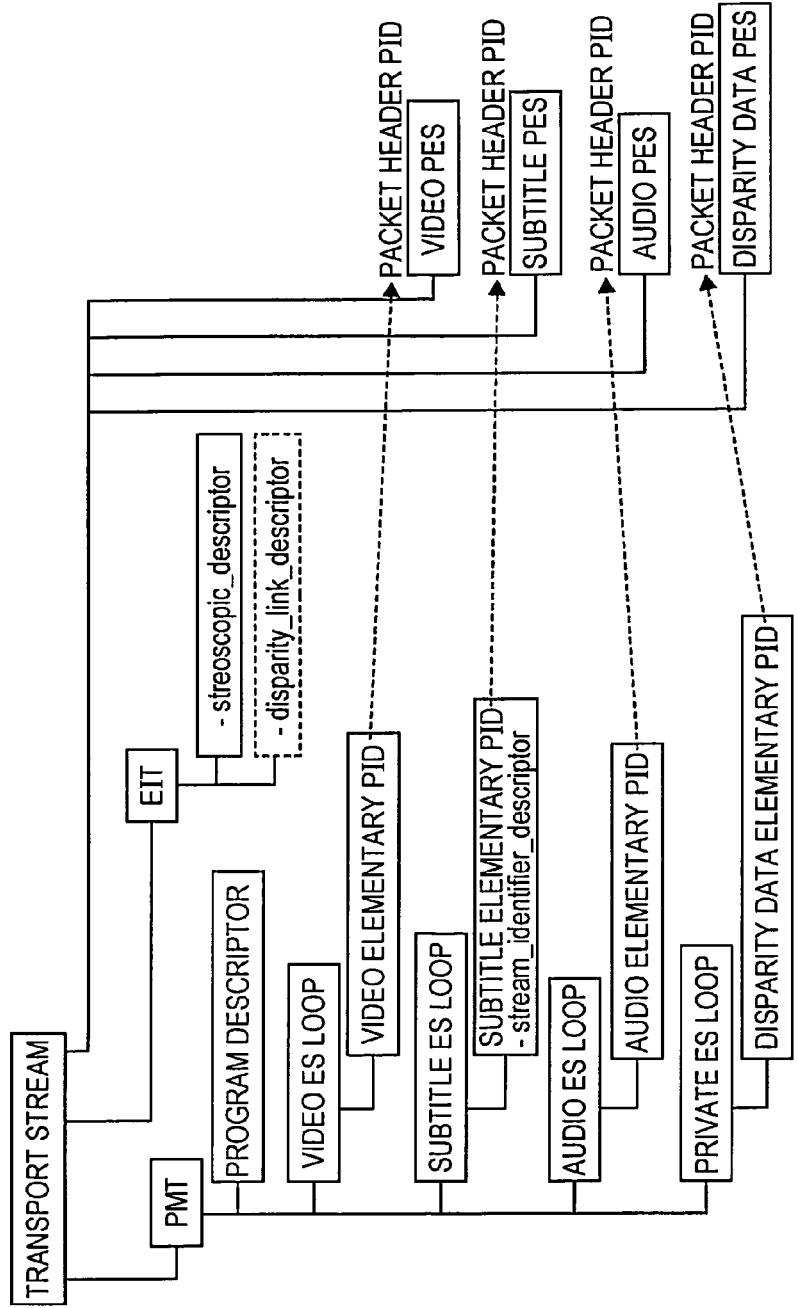
FIG. 4 shows an example of the structure of a general transport stream including a video elementary stream, a subtitle elementary stream, an audio elementary stream, and a disparity elementary stream.

FIG. 4 shows an example of the structure of the general transport stream TS including the video elementary stream, the subtitle elementary stream, the audio elementary stream, and the disparity elementary stream. The transport stream TS includes the PES packets resulting from the packetization of each elementary stream, as described above. In the example in FIG. 4, a PES packet "Video PES" for the video elementary stream is included in the transport stream TS.

A PES packet "Subtitle PES" for the subtitle elementary stream and a PES packet "Audio PES" for the audio elementary stream are also included in the transport stream TS in the example in FIG. 4. In addition, a PES packet "Disparity Data PES" for the disparity elementary stream is included in the transport stream TS in the example in FIG. 4.

The transport stream TS also includes the program map table (PMT) used as the program specific information (PSI). The PSI indicates which program each elementary stream included in the transport stream TS belongs to. The transport stream TS also includes the event information table (EIT) used as the serviced information (SI) for management in units of events. The metadata for every program is described in the EIT.

A program descriptor describing information concerning the entire program exists in the PMT. Elementary loops having information concerning the respective elementary streams exist in the PMT. A video elementary loop, a subtitle elementary loop, an audio elementary loop, and a private elementary loop exit in the example in FIG. 4. Information, such as a packet identifier (PID), is arranged in each elementary loop for every stream and a descriptor describing information concerning each elementary loop is also arranged in the elementary loop although it is not shown in FIG. 4.

The descriptor describing information concerning each elementary loop is, for example, a stream identifier descriptor (stream_identifier_descriptor). Although the stream identifier descriptor is shown only in the subtitle elementary loop in the example in FIG. 4, the stream identifier descriptors are similarly arranged in the other elementary loops. The stream identifier descriptor is an identifier (ID) (component_tag) indicating the type and positioning of the elementary stream. The arrangement of the stream identifier descriptor in each elementary loop allows the packet identifier (PID) corresponding to an ID (component_tag) that is given to be acquired.

In the present embodiment, the stereoscopic descriptor (stereoscopic_descriptor) is incorporated in the EIT, as shown in FIG. 4. The disparity link descriptor (disparity_1-ink_descriptor) is arranged in the EIT, if necessary.

[Description of Stereoscopic Descriptor]

FIG. 5 shows an example of the syntax of the stereoscopic descriptor (stereoscopic_descriptor). FIG. 6 shows the semantics of the stereoscopic descriptor. Referring to FIG. 5, "descriptor_tag" is eight-bit data indicating a descriptor type and indicates the stereoscopic descriptor in the example in FIG. 5. "Descriptor_length" is eight-bit data indicating a descriptor length (size). This data indicates the number of bytes subsequent to "descriptor_length" as the length of the descriptor.

"3D_format_type" is four-bit data indicating a 3D format type. For example, "3" indicates that the 3D format type is Side by side, "4" indicates that the 3D format type is Top and bottom, and "7" indicates that the 3D format type is Full resolution stereo. In the Full resolution stereo format, one of the left-eye image data and the right-eye image data is transmitted as base view image data and the remaining is transmitted as non-base view image data.

"2D_display_view" is one-bit data indicating a view (image) to be displayed in a 2D display mode. For example, "0" indicates that the view to be displayed is the left-eye image and "1" indicates that the view to be displayed is the right-eye image. When the 3D format is the Full resolution stereo, the view (image) to be displayed in the 2D display mode is, for example, a base view.

"Simulcast_condition" is two-bit data. This data indicates whether, when the 3D format is the Side by side or the Top and bottom, the apparatus is in a state in which 2D image data is transmitted simultaneously with stereoscopic (3D) image data in the corresponding 3D format. This data is based on the 2D image data and indicates the transmission mode of the 3D image data. This data is defined in consideration of the fact that an image in which the left-eye image and the right-eye image are horizontally or vertically arranged on the screen is displayed in a 2D receiver in the related art, which does not support the 3D image display, when the stereoscopic image data is transmitted in the Side by side format or the Top and bottom format.

For example, "0" indicates that the apparatus is not in the state in which the 2D image data is transmitted simultaneously with the 3D image data. "1" to "3" indicate that the apparatus is in the state in which the 2D image data is transmitted simultaneously with the 3D image data. Specifically, "1" indicates that the apparatus is based on the 2D image data and the 3D image data corresponding to the 2D image data is transmitted as another stream on the same channel. In this case, detailed information, such as the packet identifier (PID), can be referred to from, for example, a component descriptor (component descriptor) although a detailed description is omitted herein.

"2" indicates that the apparatus is based on the 2D image data and the 3D image data corresponding to the 2D image data is transmitted as another program (service) on another channel. In this case, detailed information, such as the other channel, can be referred to from, for example, a linkage descriptor (linkage_descriptor) although a detailed description is omitted herein. "3" indicates that the apparatus is based on the 2D image data and the 3D image data corresponding to the 2D image data is transmitted by another method, such as network communication, instead of the broadcast. In this case, detailed information, such as a Uniform Resource Locator (URL), can be referred to from, for example, another new descriptor although a detailed description is omitted herein.

"Detailed_disparity_supply" is one-bit data indicating whether detailed disparity data described in the disparity link descriptor (disparity_link_descriptor) is supplied. For example, "1" indicates that the detailed disparity data is supplied. In this case, the disparity link descriptor (disparity_link_descriptor) is incorporated in the EIT, along with the stereoscopic descriptor (stereoscopic_descriptor). "0" indicates that the detailed disparity data is not supplied. This data composes the identification information indicating whether the general-purpose disparity data or the specific-purpose disparity data is transmitted.

"Event_disparity_supply" is one-bit data indicating whether one piece of fixed disparity data for this program (event) is supplied. For example, "1" indicates that one piece of fixed disparity data for this program (event) is supplied and "0" indicates that one piece of fixed disparity data for this program (event) is not supplied. This data composes the identification information indicating whether the disparity data for every program is transmitted.

"Select_view_shift" is two-bit data that is valid only if "event_disparity_supply"=1 and that composes information specifying a target view to be shifted. This data specifies the superimposed information to be shifted on the basis of the disparity data, among the superimposed information (for example, a subtitle and/or an on-screen display (OSD) image) to be superimposed on the left-eye image and the superimposed information to be superimposed on the right-eye image. This data will be described in detail below in a description of a disparity stream.

"Disparity_value" is eight-bit data that is valid only if "event_disparity_supply"=1 and that indicates the value of the disparity data. This data takes a value of −128 to +127. This data will be described in detail below in the description of the disparity stream.

[Description of Disparity Link Descriptor]

FIG. 7 shows an example of the syntax of the disparity link descriptor (disparity_link_descriptor). FIG. 8 shows the semantics of the disparity link descriptor. Referring to FIG. 7, "descriptor_tag" is eight-bit data indicating a descriptor type and indicates the disparity link descriptor in the example in FIG. 7. "Descriptor_length" is eight-bit data indicating a descriptor length (size). This data indicates the number of bytes subsequent to "descriptor_length" as the length of the descriptor.

"Disparity_component" indicates the value of a component tag (component_tag) indicating the disparity stream including the disparity data. As described above, the packet identification (PID) of the disparity stream can be acquired on the basis of the value of the component tag.

"Subtitle_disparity_flag" is one-bit flag data indicating whether the subtitle disparity data is set. This flag data composes the identification information indicating whether the specific-purpose disparity data is transmitted, along with the data in "detailed_disparity_supply" in the stereoscopic descriptor. For example, "1" indicates that the subtitle disparity data is set and "0" indicates that the subtitle disparity data is not set.

"General_use_disparity_flag" is one-bit flag data indicating whether the general-purpose disparity data exists. This flag data composes the identification information indicating whether the general-purpose disparity data is transmitted, along with the data in "detailed_disparity_supply" in the stereoscopic descriptor. For example, "1" indicates that the general-purpose disparity data exists and "0" indicates that the general-purpose disparity data does not exist.

"Reserved_for_future_use" indicates a reserved area. This data will be used as a flag data area indicating whether the disparity data for the corresponding application is set if broadcast data (for example, data broadcast) for which the disparity data is used appears.

[Description of Subtitle Stream]

Figure 9A:
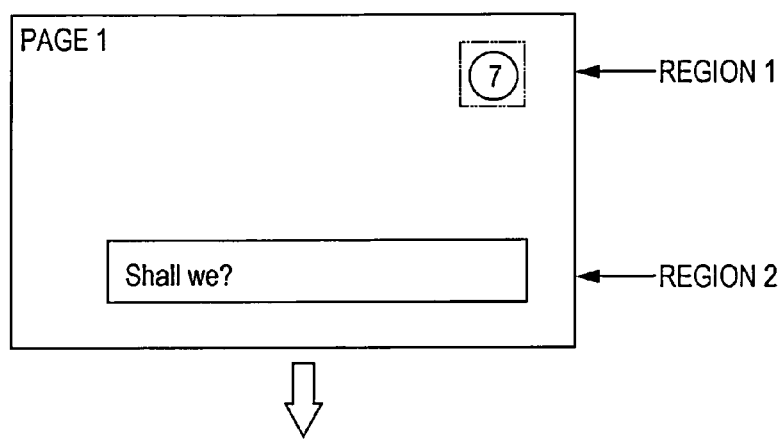
FIG. 9A shows an example of 2D display of subtitles and FIG. 9B shows an example of 3D display of the subtitles.
Figure 9B:
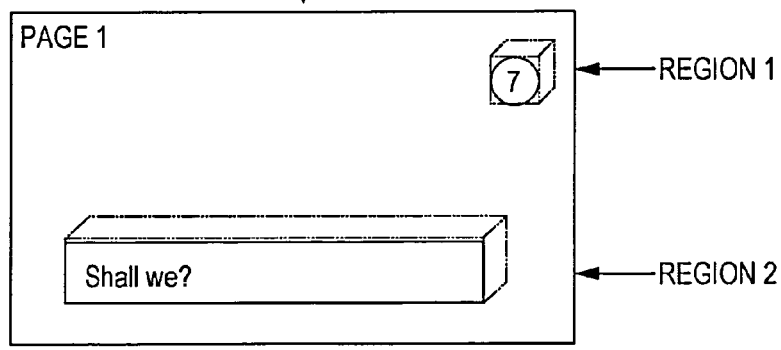

FIG. 9A shows an example of 2D display of subtitles and FIG. 9B shows an example of 3D display of the subtitles. FIG. 9A shows an example of how the subtitles are two-dimensionally superimposed. In this example, a subtitle representing a figure "7" surrounded by a circle is superimposed on a region 1 and a subtitle representing a string "Shall we?" is superimposed on a region 2. In the example in FIG. 9A, each subtitle is recognized on the screen.

FIG. 9B shows an example of how the subtitles are three-dimensionally superimposed. Also in this example, the subtitle representing the figure "7" surrounded by the circle is superimposed on the region 1 and the subtitle representing the string "Shall we?" is superimposed on the region 2. In the example in FIG. 9B, each subtitle is capable of being recognized at a position closer than the closest position of the image by using the disparity data.

A case in which the one-bit flag data in "subtitle_disparity_flag" in the disparity link descriptor is set to "1" indicating that the subtitle disparity data is set will now be described. In this case, the disparity data about each region in each page is set in units of display sets, as described above. Specifically, for example, one piece of disparity data commonly used in the frame period including frames of the certain number composing the display set is set for each region or multiple pieces of disparity data sequentially updated in the frame period including frames of the certain number are set for each region.

Figure 10:
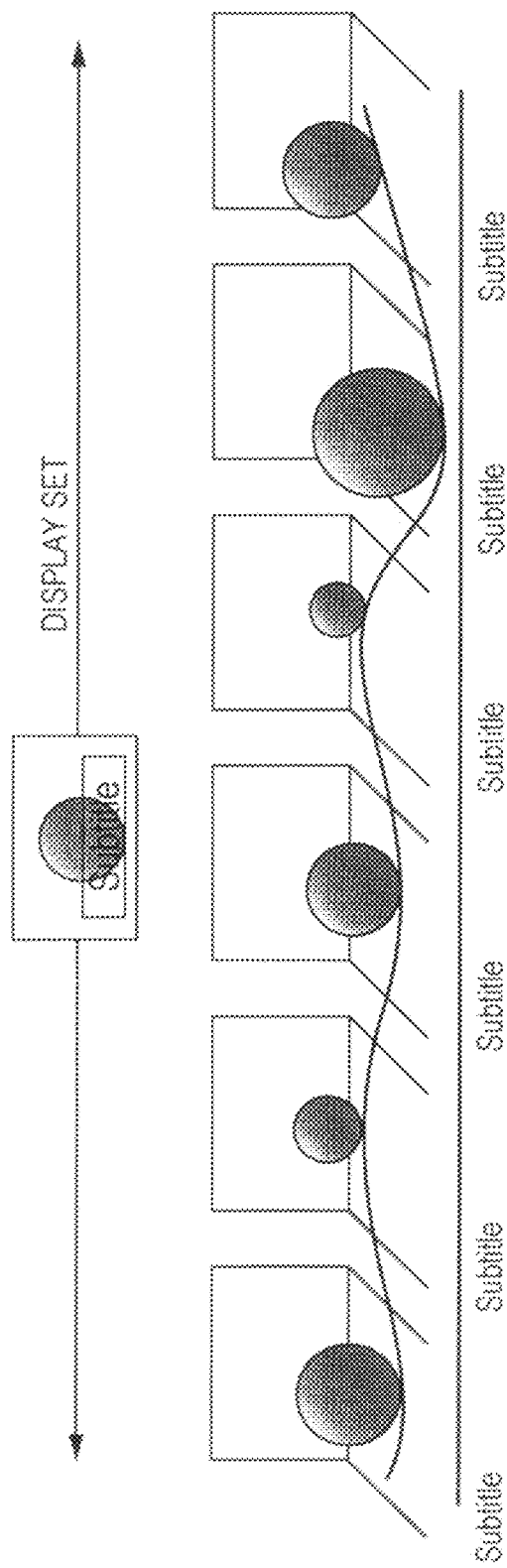
FIG. 10 shows an example of the depth of a subtitle in each frame in a display set when one piece of disparity data commonly used in a frame period including frames of a certain number composing the display set is set.

When one piece of disparity data commonly used in the frame period including frames of the certain number composing the display set is set for each region, the depth of the subtitle is constant during the corresponding display set. FIG. 10 shows an example of the depth of a subtitle "Subtitle" in each frame in a display set in the above case.

Figure 11:
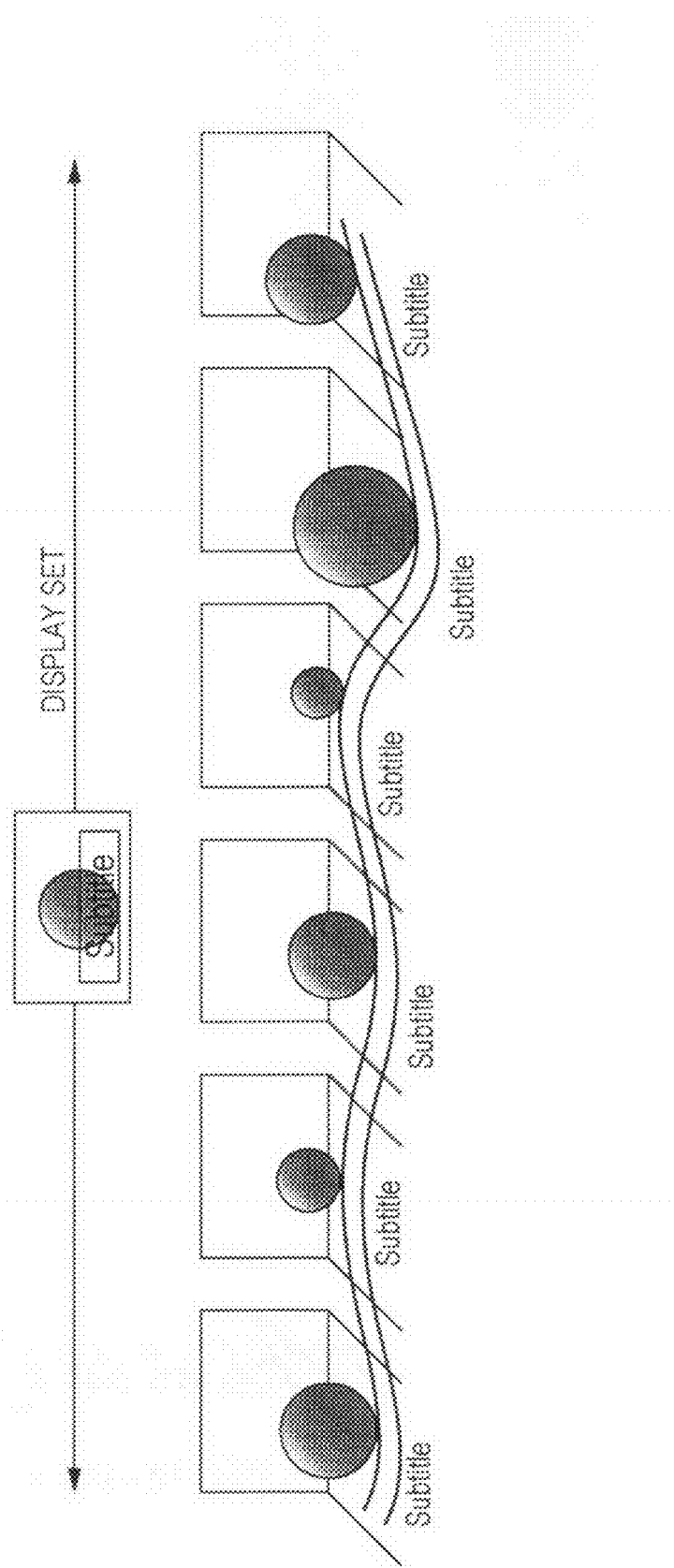
FIG. 11 shows an example of the depth of a subtitle in each frame in a display set when multiple pieces of disparity data sequentially updated in the frame period including frames of the certain number composing the display set are set.

When multiple pieces of disparity data sequentially updated in the frame period including frames of the certain number composing the display set are set for each region, the depth of the subtitle can be varied with a variation in position of the object in the stereoscopic image in the corresponding display set. FIG. 11 shows an example of the depth of the subtitle "Subtitle" in each frame in the display set in the above case.

Figure 12:
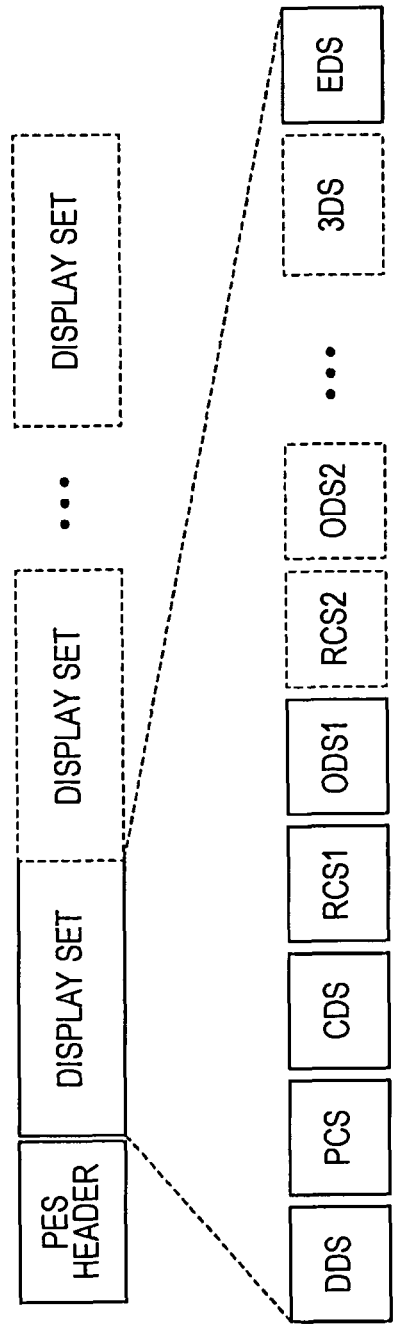
FIG. 12 shows an example of the structure of subtitle data.

FIG. 12 shows an example of the structure of the subtitle data. The subtitle data includes a PES header and data about each display set subsequent to the PES header. The data about each display set includes a "3DS" that is newly defined, in addition to segments of DDS", "PCS", "CDS", "RCS", "ODS", and "EDS."

The "DDS" is a display definition segment (Display_Definition_Segment) and defines the area where the subtitle (caption) is displayed. The "PCS" is a page composition segment (Page_Composition_Segment) and indicates the state of the entire page, each region composing the page, and positional information about each region. The "RCS" is a region composition segment (Region_Composition_Segment) and indicates each object arranged in the region and positional information about each object.

The "CDS" is a CLUT definition segment (CLUT_Definition_Segment) and is data about each color lookup table (CLUT) specified by the "RCS." The "ODS" is an object data segment (Object_Data_Segment) and is data about each object. Bitmap data or text data is described in the "ODS" depending on the type of the object. The "EDS" is an end-of-display set segment and indicates the end of transmission of the display set.

The "3DS" is a 3D segment and includes a variety of information concerning the subtitle disparity data. When one piece of disparity data commonly used in the frame period including frames of the certain number composing the display set exists as the disparity data, the disparity data is included in the "3DS." When multiple pieces of disparity data (disparity sequence) sequentially updated in the frame period including frames of the certain number composing the display set are set as the disparity data, the identification information identifying the disparity sequence in the disparity stream is included in the "3DS." An example of a detailed structure of the "3DS" will be described below.

FIG. 13 shows the syntax of a subtitle stream (PES), that is, Digital Video Broadcasting (DVB)_Subtitling. This syntax is standardized according to European Telecommunications Standards Institute (ETSI) (ETSI EN 300 743). The syntax shown in FIG. 13 is viewed from a PES layer. "PES_data_field" includes eight-bit information indicating the subtitle data indicated by "data_identifer." "PES_data_field" also includes eight-bit information identifying the subtitle stream indicated by "subtitle_strem_id."

"PES_data_field" also includes "Subtitling_segment." "Subtitling_segment" includes "sync_byte", "segment_type", "page_id", "segment_length", and "segment_data_field." "Page_id" is identification information identifying each page.

"Segment_type" is eight-bit information indicating the type of the segment. FIG. 14 shows the correspondence between each value of "segment_type" and the segment type. For example, "0x10" indicates the page composition segment (PCS). "0x11" indicates the region composition segment (RCS).

Although "0x40" is reserved in the related art, it is newly defined as information indicating the 3D segment (3DS) in the present embodiment. A subtitle decoder in the related art, which does not support the 3D display, skips this segment because "0x40" is reserved. In contrast, since a decoder supporting the 3D display recognizes "0x40" as the 3DS, the decoder is capable of reading out a variety of information concerning the subtitle disparity data from this segment.

[Description of 3D Segment]

FIG. 15 shows an example of the syntax of the 3DS (3D_segment). FIG. 16 shows the semantics of the 3DS. "3D_segment" includes "sync_byte", "segment_type", "page_id", and "segment_length." "Page_id" is identification information identifying each page. "Segment_type" is eight-bit data indicating a segment type and is set to "0x40" indicating the 3DS in this example. "Segment_length" is eight-bit data indicating a segment length. This data indicates the number of bytes subsequent to "segment_length" as the length of the segment.

"3D_segment" also includes "disparity_static_supply" and "disparity_sequence_supply." "Disparity_static_supply" is one-bit data indicating whether the value of the fixed disparity data is supplied in units of regions/display sets. For example, "1" indicates that the value of the fixed disparity data is supplied in units of regions/display sets and "0" indicates that the value of the fixed disparity data is not supplied. In other words, "disparity_static_supply=1" indicates that one piece of disparity data commonly used in the frame period including frames of the certain number composing the display set exists for each region.

"Disparity_sequence_supply" is one-bit data indicating whether the disparity sequence indicating the variation with time of the value of the disparity data is supplied in units of regions/display sets. For example, "1" indicates that the disparity sequence indicating the variation with time of the value of the disparity data is supplied in units of regions/display sets and "0" indicates that the disparity sequence indicating the variation with time of the value of the disparity data is not supplied. In other words, "disparity_sequenc_supply=1" indicates that multiple pieces of disparity data (disparity sequence) sequentially updated in the frame period including frames of the certain number composing the display set are set for each region.

"3D_segment" further includes "select_view_shift" and "number_of_regions." "Select_view_shift" is two-bit data composing information specifying a target view to be shifted. This data specifies a subtitle to be shifted on the basis of the disparity data, among the subtitles to be superimposed on the left-eye image and the right-eye image. This data will be described in detail below in the description of the disparity stream. "Number_of_regions" indicates the number of regions.

"3D_segment" further includes either of "disparity_value" and "disparity_sequence_id" of the number of regions, or both of "disparity_value" and "disparity_sequence_id" of the number of regions. "Disparity_value" is included if "disparity_static_supply" is set to one indicating that the value of fixed disparity data is supplied. "Disparity_value" is eight-bit data indicating the value of the disparity data for every region/display set. This data will be described in detail below in the description of the disparity stream.

"Disparity_sequence_id" is included if "disparity_sequence_supply" is set to one indicating that the disparity sequence is supplied. "Disparity_sequence_id" is the identifier specifying a specific disparity sequence on the disparity stream, indicating the variation with time of the value of the disparity data for every region/display set.

[Description of Disparity Stream]

Embedding of the disparity data in the disparity stream will now be described. FIG. 17 shows an example of the syntax of the disparity stream, that is, shows an example of the syntax of "PES_data_field" including the disparity data. This syntax includes, for example, "data_identifier", "disparity_stream id", "disparity_data_set", and "end_of_PES_data_field_marker."

FIG. 18 shows an example of the syntax of "disparity_data_set." FIG. 19 shows the main semantics of "disparity_data_set." The syntax includes, for example, "sync_byte", "disparity_sequence_id", "select_view_shift", "frame_count", and "disparity_value." "Disparity_sequence_id" indicates the identifier of the disparity sequence.

"Select_view_shift" is two-bit information specifying a target view to be shifted. "Select_view_shift" specifies a service component to be shifted on the basis of the disparity data, among the service component to be superimposed on the left-eye image and the service component to be superimposed on the right-eye image. For example, "select_view_shift=00" is reserved. The service component is, for example, subtitle information or closed-captioning information.

"Select_view_shift=01" indicates that only the service component (for example, the subtitle) to be superimposed on the left-eye image is horizontally shifted by an amount given by the disparity data. When the disparity data has a positive value, the service component to be superimposed on the left-eye image is shifted rightward. When the disparity data has a negative value, the service component to be superimposed on the left-eye image is shifted leftward.

"Select_view_shift=10" indicates that only the service component (for example, the subtitle) to be superimposed on the right-eye image is horizontally shifted by the amount given by the disparity data. When the disparity data has a positive value, the service component to be superimposed on the right-eye image is shifted rightward. When the disparity data has a negative value, the service component to be superimposed on the right-eye image is shifted leftward.

"Select_view_shift=11" indicates that both the service component to be superimposed on the left-eye image and the service component to be superimposed on the right-eye image are horizontally shifted in opposing directions. The service component to be superimposed on the left-eye image is shifted rightward by an amount given by the disparity data/2 when the disparity data has a positive even value, and the service component to be superimposed on the left-eye image is shifted leftward by the amount given by the disparity data/2 when the disparity data has a negative even value. The service component to be superimposed on the right-eye image is shifted leftward by the amount given by the disparity data/2 when the disparity data has a positive even value, and the service component to be superimposed on the right-eye image is shifted rightward by the amount given by the disparity data/2 when the disparity data has a negative even value.

The service component to be superimposed on the left-eye image is shifted rightward by an amount given by the disparity data+½ when the disparity data has a positive odd value, and the service component to be superimposed on the left-eye image is shifted leftward by the amount given by the disparity data+½ when the disparity data has a negative odd value. The service component to be superimposed on the right-eye image is shifted leftward by an amount given by the disparity data−½ when the disparity data has a positive odd value, and the service component to be superimposed on the right-eye image is shifted rightward by the amount given by the disparity data−½ when the disparity data has a negative odd value.

"Frame_count" indicates the number of frames included in the display set. "Disparity_value" is eight-bit data indicating the value of the disparity data and takes a value of −128 to +127. When this data has a positive value, the depth of the 3D display is farther than the screen. When this data has a negative value, the depth of the 3D display is closer than the screen.

The values of "disparity_value" of the number of frames indicated by "frame_count" are included in "disparity_data_set" identified by "disparity_sequence_id." In other words, the disparity sequence indicated by "disparity_sequence_id" is the disparity sequence composed of the values of "disparity_value" of the number of frames indicated by "frame_count."

[Operation of Transmission Data Generating Unit]

The operation of the transmission data generating unit 110 shown in FIG. 2 will now be briefly described. The stereoscopic (3D) image data about a certain program output from the data extractor 111 is supplied to the video encoder 112. The video encoder 112 performs the encoding, such as MPEG4-AVC or MPEG2, to the image data to generate a video elementary stream including the encoded video data. The video elementary stream is supplied to the multiplexer 117.

When the stereoscopic image data about the certain program is output from the data extractor 111 in the above manner and the disparity data corresponding to the stereoscopic image data is recorded on the data recording medium 111a, the disparity data is also output from the data extractor 111. The disparity data is, for example, the disparity data for every program, the general-purpose disparity data, or the specific-purpose disparity data (the subtitle disparity data in the present embodiment), as described above.

The disparity data about each region in each page exists in the specific-purpose disparity data in units of display sets in association with the stereoscopic image data about the certain program. One piece of disparity data commonly used in the frame period including frames of the certain number composing the display set is set for each region or multiple pieces of disparity data sequentially updated in the frame period including frames of the certain number are set for each region. Each disparity data may solely exist or may be duplicated.

When the disparity data output from the data extractor 111 is the disparity data for every program, the disparity data is supplied to the multiplexer 117. When the disparity data output from the data extractor 111 is the general-purpose disparity data, the disparity data is supplied to the disparity data encoder 113.

When the disparity data output from the data extractor 111 is the specific-purpose disparity data and one piece of disparity data commonly used in the frame period including frames of the certain number is set for each region, the disparity data is supplied to the subtitle encoder 116. When the disparity data output from the data extractor 111 is the specific-purpose disparity data and multiple pieces of disparity data sequentially updated in the frame period including frames of the certain number are set for each region, the disparity data is supplied to the disparity data encoder 113.

The disparity data encoder 113 performs certain encoding to the disparity data to generate a disparity elementary stream (refer to FIGS. 17 to 19) including the encoded data. The disparity elementary stream is supplied to the multiplexer 117. When both the general-purpose disparity data and the specific-purpose disparity data (multiple pieces of disparity data sequentially updated in the frame period including frames of the certain number) exist, the pieces of disparity data can be discriminated on the basis of, for example, "disparity_sequence_id."

When the stereoscopic image data about the certain program is output from the data extractor 111, the audio data corresponding to the image data is also output from the data extractor 111. The audio data is supplied to the audio encoder 114. The audio encoder 114 performs the encoding, such as MPEG-2Audio AAC, to the audio data to generate an audio elementary stream including the encoded audio data. The audio elementary stream is supplied to the multiplexer 117.

The subtitle generator 115 generates subtitle data to be superimposed on the image (view) for the image data output from the data extractor 111. The subtitle data is supplied to the subtitle encoder 116. The subtitle encoder 116 performs certain encoding to the subtitle data to generate a subtitle elementary stream including the encoded data. The subtitle elementary stream is supplied to the multiplexer 117.

The 3D segment (3DS) (refer to FIGS. 15 and 16) having a variety of information concerning the subtitle disparity data is included in the subtitle data as data about each display set. The subtitle encoder 116 incorporates the subtitle disparity data (one piece of disparity data commonly used in the frame period including frames of the certain number in each region) supplied from the data extractor 111 in the 3D segment as information in "disparity_value." In this case, the value of "disparity_static_supply" is set to, for example, one indicating that the fixed disparity data for every region/display set is supplied.

When the specific-purpose disparity data (multiple pieces of disparity data sequentially updated in the frame period including frames of the certain number) is output from the data extractor 111 in the above manner, the value of "disparity_sequence_supply" is set to, for example, one indicating that the disparity sequence indicating the variation with time of the value of the disparity data is supplied in units of regions/display sets. "Disparity_sequence_id" is the identifier specifying a specific disparity sequence on the disparity stream, indicating the variation with time of the value of the disparity data for every region/display set.

The multiplexer 117 packetizes the elementary streams supplied from the respective encoders for multiplexing to generate the transport stream TS. The stereoscopic descriptor (stereoscopic_descriptor) (refer to FIGS. 5 and 6) is incorporated in the transport stream TS. The disparity link descriptor (disparity_link_descriptor) (refer to FIGS. 7 and 8) is also incorporated in the transport stream TS, if necessary. Theses descriptors are incorporated in the EIT (refer to FIG. 4).

When the disparity data for every program is output from the data extractor 111, the value of "event_disparity_supply" in the stereoscopic descriptor is set to, for example, one indicating that the disparity data for every program is supplied. The disparity data for every program is incorporated in the stereoscopic descriptor as the information in "disparity_value." When at least one of the general-purpose disparity data and the subtitle disparity data is output from the data extractor 111, the value of "detailed_disparity_supply" in the stereoscopic descriptor is set to, for example, one. In this case, the disparity link descriptor (disparity_link_descriptor) is incorporated in the transport stream TS.

When the general-purpose disparity data is output from the data extractor 111, the flag data in "general_use_disparity_flag" in the disparity link descriptor is set to, for example, one indicating that the general-purpose disparity data is supplied. When the subtitle disparity data is output from the data extractor 111, the flag data in "subtitle_disparity_flag" in the disparity link descriptor is set to, for example, one indicating that the subtitle disparity data is supplied.

[Exemplary Configuration of Receiver Apparatus]

FIG. 20 is a block diagram showing an example of the configuration of the receiver apparatus 200. Referring to FIG. 20, the receiver apparatus 200 includes an antenna terminal 201, a digital tuner 202, a demultiplexer 203, a video decoder 204, and a 3D signal processor 205. The receiver apparatus 200 also includes a subtitle decoder 206, a subtitle generator 207, a disparity data decoder 208, a metadata processor 209, a disparity data output unit 210, and an OSD data generator 211. The receiver apparatus 200 further includes a superimposer unit 212, a display unit 213, an audio decoder 214, an audio processor circuit 215, an audio amplifier circuit 216, and a speaker 217.

The antenna terminal 201 is a terminal through which a television broadcast signal received with a reception antenna (not shown) is input into the receiver apparatus 200. The digital tuner 202 processes the television broadcast signal input through the antenna terminal 201 to output a certain transport stream (bitstream data) TS (refer to FIG. 3) corresponding to a channel selected by a user. The demultiplexer 203 extracts a video elementary stream, an audio elementary stream, a subtitle elementary stream, and a disparity elementary stream from the transport stream TS supplied from the digital tuner 202. The demultiplexer 203 also extracts the tables including the EIT and the PMT from the transport stream TS.

The video decoder 204 performs processing opposite to the one in the video encoder 112 in the transmission data generating unit 110 described above. Specifically, the video decoder 204 performs decoding to the encoded image data included in the video elementary stream extracted by the demultiplexer 203 to acquire decoded stereoscopic image data. The 3D signal processor 205 performs processing corresponding to the 3D format to the stereoscopic image data acquired in the video decoder 204 to generate left-eye image data SL and right-eye image data SR.

The subtitle decoder 206 performs processing opposite to the one in the subtitle encoder 116 in the transmission data generating unit 110 described above. Specifically, the subtitle decoder 206 performs the decoding to the encoded subtitle data included in the subtitle elementary stream extracted by the demultiplexer 203 to acquire decoded subtitle data.

The subtitle decoder 206 acquires a variety of information concerning the subtitle disparity data included in the 3D segment (3DS). For example, the subtitle decoder 206 acquires the information in "disparity_static_supply" indicating whether the fixed disparity data for every region/display set is supplied from the 3D segment. For example, the subtitle decoder 206 acquires the information in "disparity_sequence_supply" indicating whether the disparity sequence for every region/display set is supplied from the 3D segment.

When the specific-purpose disparity data (one piece of disparity data commonly used in the frame period including frames of the certain number for each region) is transmitted, the subtitle decoder 206 also acquires the specific-purpose disparity data because the specific-purpose disparity data is included in the 3D segment. The subtitle generator 207 generates subtitle display data to be superimposed on an image on the basis of the subtitle data acquired by the subtitle decoder 206.

The disparity data decoder 208 performs processing opposite to the one in the disparity data encoder 113 in the transmission data generating unit 110 described above. Specifically, the disparity data decoder 208 performs the decoding to the encoded disparity data included in the disparity elementary stream extracted by the demultiplexer 203 to acquire decoded disparity data. The disparity data decoder 208 acquires the disparity data only when either of the general-purpose disparity data and the specific-purpose disparity data (multiple pieces of disparity data sequentially updated in the frame period including frames of the certain number) or both thereof are transmitted.

The metadata processor 209 processes the stereoscopic descriptor (refer to FIGS. 5 and 6) and the disparity link descriptor (refer to FIGS. 7 and 8) incorporated in the EIT supplied from the demultiplexer 203 to acquire a variety of information concerning the disparity data. For example, the metadata processor 209 acquires the information in "event_disparity_supply" indicating whether the disparity data for every program is transmitted from the stereoscopic descriptor. The metadata processor 209 acquires the information in "detailed_disparity_supply" indicating whether the detailed disparity data is transmitted from the stereoscopic descriptor. When the identification information for every program is transmitted, the metadata processor 209 also acquires the identification information for every program because the identification information for every program is included in the stereoscopic descriptor.

In addition, for example, the metadata processor 209 acquires the information in "general_use_disparity_flag" indicating whether the general-purpose disparity data is transmitted from the disparity link descriptor. The metadata processor 209 acquires the information in "subtitle_disparity_flag" indicating whether the subtitle disparity data is transmitted from the disparity link descriptor. The metadata processor 209 acquires the information in "disparity_component" from the disparity link descriptor. The information in "disparity_component" indicates the value of the component tag (component_tag) indicating the disparity stream including the disparity data. The packet identification (PID) of the disparity stream can be acquired on the basis of the value of the component tag.

The disparity data output unit 210 determines the disparity data to be used on the basis of the disparity data from the disparity data decoder 208, the variety of information concerning the disparity data from the subtitle decoder 206, and the variety of information concerning the disparity data from the metadata processor 209 to output the determined disparity data.

Figure 21:
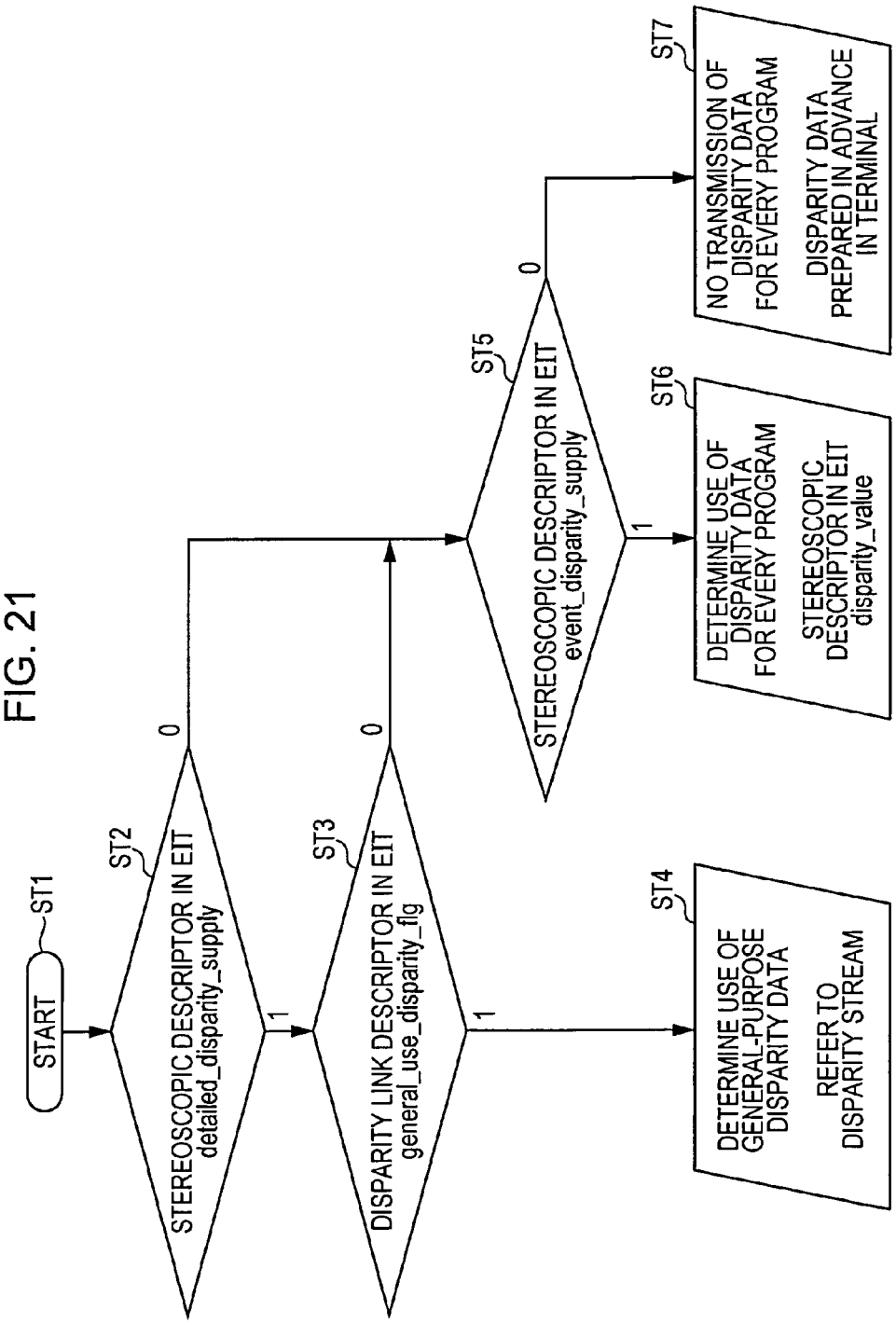
FIG. 21 is a flowchart showing an example of a process performed by a disparity data output unit when superimposed information is an on-screen display (OSD) image.

FIG. 21 is a flowchart showing an example of a process performed by the disparity data output unit 210 when the superimposed information is an OSD image. Referring to FIG. 21, in Step ST1, the disparity data output unit 210 starts the process. In Step ST2, the disparity data output unit 210 refers to the information in "detailed_disparity_supply" in the stereoscopic descriptor to determine whether the detailed disparity data is transmitted.

If "detailed_disparity_supply=1" and the disparity data output unit 210 determines that the detailed disparity data is transmitted, the process goes to Step ST3. In Step ST3, the disparity data output unit 210 refers to the information in "general_use_disparity_flag" in the disparity link descriptor to determine whether the general-purpose disparity data is transmitted. If "general_use_disparity_flag=1" and the disparity data output unit 210 determines that the general-purpose disparity data is transmitted, the process goes to Step ST4. In Step ST4, the disparity data output unit 210 determines the general-purpose disparity data acquired from the disparity stream in the disparity data decoder 208 to be the disparity data to be used and outputs the determined disparity data.

If "detailed_disparity_supply=0" and the disparity data output unit 210 determines that the detailed disparity data is not transmitted in Step ST2, the process goes to Step ST5. If "general_use_disparity_flag=0" and the disparity data output unit 210 determines that the general-purpose disparity data is not transmitted in Step ST3, the process goes to Step ST5. In Step ST5, the disparity data output unit 210 refers to the information in "event_disparity_supply" in the stereoscopic descriptor to determine whether the disparity data for every program is transmitted.

If "event_disparity_supply=1" and the disparity data output unit 210 determines that the disparity data for every program is transmitted, the process goes to Step ST6. In Step ST6, the disparity data output unit 210 determines the disparity data for every program (disparity_value) acquired from the stereoscopic descriptor in the metadata processor 209 to be the disparity data to be used and outputs the determined disparity data. If "event_disparity_supply=0" and the disparity data output unit 210 determines that the disparity data for every program is not transmitted, the process goes to Step ST7. In Step ST7, the disparity data output unit 210 determines the disparity data prepared in advance in the receiver apparatus 200 to be the disparity data to be used and outputs the determined disparity data.

Figure 22:
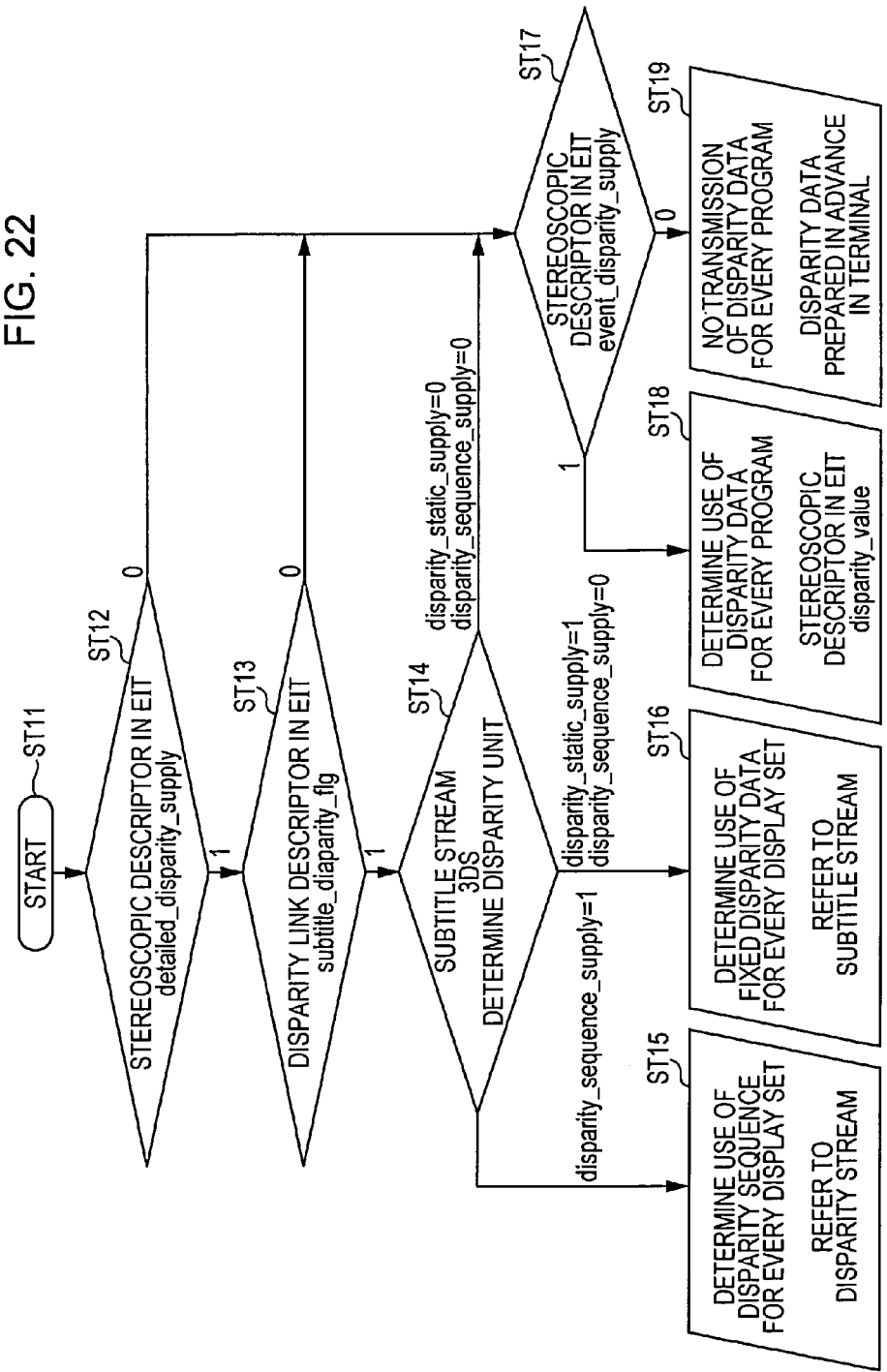
FIG. 22 is a flowchart showing an example of a process performed by the disparity data output unit when the superimposed information is a subtitle.

FIG. 22 is a flowchart showing an example of a process performed by the disparity data output unit 210 when the superimposed information is a subtitle. Referring to FIG. 22, in Step ST11, the disparity data output unit 210 starts the process. In Step ST12, the disparity data output unit 210 refers to the information in "detailed_disparity_supply" in the stereoscopic descriptor to determine whether the detailed disparity data is transmitted.

If "detailed_disparity_supply=1" and the disparity data output unit 210 determines that the detailed disparity data is transmitted, the process goes to Step ST13. In Step ST13, the disparity data output unit 210 refers to the information in "subtitle_disparity_flag" in the disparity link descriptor to determine whether the subtitle disparity data is transmitted. If "subtitle_disparity_flag=1" and the disparity data output unit 210 determines that the subtitle disparity data is transmitted, the process goes to Step S14.

In Step ST14, the disparity data output unit 210 refers to the information in "disparity_static_supply" and "disparity_sequence_supply" acquired from the 3D segment (3DS) for the determination. If "disparity_sequence_supply=1" and the disparity data output unit 210 determines that the disparity sequence for every region/display set is supplied, the process goes to Step ST15. In Step ST15, the disparity data output unit 210 determines the disparity sequence for every region/display set acquired from the disparity stream in the disparity data decoder 208 to be the disparity data to be used and outputs the determined disparity data.

If "disparity_static_supply=1" and "disparity_sequence_supply=0" and the disparity data output unit 210 determines that only the fixed disparity data for every region/display set is supplied, the process goes to Step ST16. In Step ST16, the disparity data output unit 210 determines the fixed disparity data for every region/display set acquired in the subtitle decoder 206 to be the disparity data to be used and outputs the determined disparity data.

If "detailed_disparity_supply=0" and the disparity data output unit 210 determines that the detailed disparity data is not transmitted in Step ST12, the process goes to Step ST17. If "subtitle_disparity_flag=0" and the disparity data output unit 210 determines that the subtitle disparity data is not transmitted in Step ST13, the process goes to Step S17. If "disparity_static_supply=0" and "disparity_sequence_supply=0" and the disparity data output unit 210 determines that neither of the fixed disparity data and the disparity sequence for every region/display set is transmitted in Step ST14, the process goes to Step S17.

In Step ST17, the disparity data output unit 210 refers to the information in "event_disparity_supply" in the stereoscopic descriptor to determine whether the disparity data for every program is transmitted. If "event_disparity_supply=1" and the disparity data output unit 210 determines that the disparity data for every program is transmitted, the process goes to Step ST18. In Step ST18, the disparity data output unit 210 determines the disparity data for every program (disparity_value) acquired from the stereoscopic descriptor in the metadata processor 209 to be the disparity data to be used and outputs the determined disparity data. If "event_disparity_supply=0" and the disparity data output unit 210 determines that the disparity data for every program is not supplied in Step S17, the process goes to Step ST19. In Step ST19, the disparity data output unit 210 determines the disparity data prepared in advance in the receiver apparatus 200 to be the disparity data to be used and outputs the determined disparity data.

Referring back to FIG. 20, the superimposer unit 212 superimposes the subtitle display data and the OSD data on the left-eye image data and the right-eye image data acquired in the 3D signal processor 205. In this case, the superimposer unit 212 performs a shifting process to the superimposed information (the subtitle and/or the OSD image) displayed on the left-eye image and the right-eye image on the basis of the disparity data supplied from the disparity data output unit 210 to add the disparity.

Figure 23:
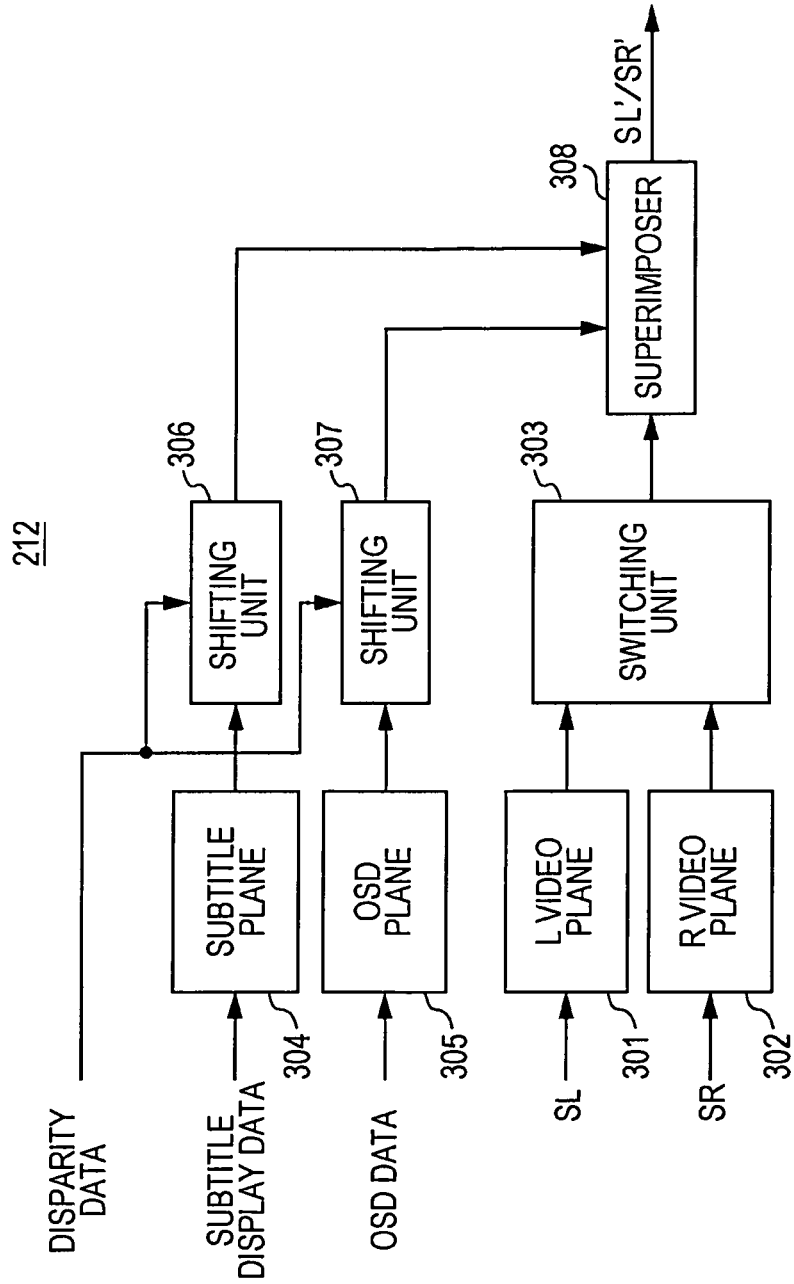
FIG. 23 is a block diagram showing an example of the configuration of a superimposer unit in the receiver apparatus.

FIG. 23 shows an example of the configuration of the superimposer unit 212. Referring to FIG. 23, the superimposer unit 212 includes an L video plane 301, an R video plane 302, a switching unit 303, a subtitle plane 304, an OSD plane 305, a shifting unit 306, a shifting unit 307, and a superimposer 308.

The L video plane 301 temporarily stores the left-eye image data supplied from the 3D signal processor 205. The R video plane 302 temporarily stores the right-eye image data supplied from the 3D signal processor 205. The switching unit 303 alternately extracts the image data from the L video plane 301 and the image data from the R video plane 302 and outputs the extracted image data. In other words, the switching unit 303 alternately outputs the left-eye image data and the right-eye image data.

The subtitle plane 304 temporarily stores the subtitle display data generated in the subtitle generator 207. The shifting unit 306 extracts the subtitle display data from the subtitle plane 304 and performs the shifting process to the subtitle display data on the basis of the disparity data supplied from the disparity data output unit 210. This process gives a horizontal shift to the subtitle to be superimposed on the left-eye image and the right-eye image to add the disparity. The shifting unit 306 outputs the subtitle display data to be superimposed on the left-eye image data and the right-eye image data in synchronization with the output of the left-eye image data and the right-eye image data from the switching unit 303.

In this case, when the disparity data supplied from the disparity data output unit 210 is the disparity sequence for every display set, the disparity sequentially varying for each frame for every display set is added to each region. When the disparity data supplied from the disparity data output unit 210 is the fixed disparity data for every display set, the disparity fixed for each display set is added to each region.

When the disparity data supplied from the disparity data output unit 210 is the disparity data for every program, the disparity fixed for each program is added to each region. When the disparity data supplied from the disparity data output unit 210 is the disparity data prepared in advance in the receiver apparatus 200, the disparity produced from the disparity data is added.

The OSD plane 305 temporarily stores the OSD data generated in the OSD data generator 211. The shifting unit 307 extracts the OSD data from the OSD plane 305 and performs the shifting process to the OSD data on the basis of the disparity data supplied from the disparity data output unit 210. This process gives a horizontal shift to the OSD image to be superimposed on the left-eye image and the right-eye image to add the disparity. The shifting unit 307 outputs the OSD data to be superimposed on the left-eye image data and the right-eye image data in synchronization with the output of the left-eye image data and the right-eye image data from the switching unit 303.

When the disparity data supplied from the disparity data output unit 210 is the general-purpose disparity data, for example, the disparity corresponding to the position where each OSD image is displayed is added on the basis of the disparity data. When the disparity data supplied from the disparity data output unit 210 is the disparity data for every program, the disparity fixed for each program is added to each OSD image. When the disparity data supplied from the disparity data output unit 210 is the disparity data prepared in advance in the receiver apparatus 200, the disparity produced from the disparity data is added to each OSD image.

The superimposer 308 superimposes the subtitle display data supplied from the shifting unit 306 and the OSD data supplied from the shifting unit 307 on the left-eye image data and the right-eye image data supplied from the switching unit 303. The superimposer 308 alternately outputs left-eye image data SL' on which the subtitle and/or the OSD image is superimposed and right-eye image data SR' on which the subtitle and/or the OSD image is superimposed.

Referring back to FIG. 20, the display unit 213 is, for example, a liquid crystal display panel or a plasma display. The display unit 213 alternately displays the image generated from the left-eye image data SL' and the image generated from the right-eye image data SR', supplied from the superimposer unit 212. The left-eye image and the right-eye image displayed in the display unit 213 in the above manner are perceived by, for example, a viewer wearing shutter glasses (not shown) with his/her left and right eyes to present a stereoscopic image.

The audio decoder 214 performs processing opposite to the one in the audio encoder 114 in the transmission data generating unit 110 described above. Specifically, the audio decoder 214 performs the decoding to the encoded audio data included in the audio elementary stream extracted in the demultiplexer 203 to acquire decoded audio data. The audio processor circuit 215 performs necessary processing, such as digital-analog (D/A) conversion, to the audio data acquired by the audio decoder 214. The audio amplifier circuit 216 amplifies an audio signal supplied from the audio processor circuit 215 and supplies the amplified audio signal to the speaker 217.

[Operation of Receiver Apparatus]

The operation of the receiver apparatus 200 shown in FIG. 20 will now be briefly described. A television broadcast signal input through the antenna terminal 201 is supplied to the digital tuner 202. The digital tuner 202 processes the television broadcast signal to output the transport stream TS corresponding to a channel selected by the user. The transport stream TS is supplied to the demultiplexer 203. The demultiplexer 203 extracts a video elementary stream, a subtitle elementary stream, a disparity elementary stream, and an audio elementary stream from the transport stream TS. The demultiplexer 203 also extracts the tables including the EIT and PIT from the transport stream TS.

The video elementary stream extracted in the demultiplexer 203 is supplied to the video decoder 204. The video decoder 204 performs the decoding to the encoded image data included in the video elementary stream to acquire decoded stereoscopic image data. The stereoscopic image data is supplied to the 3D signal processor 205. The 3D signal processor 205 performs processing corresponding to the 3D format to the stereoscopic image data to generate the left-eye image data SL and the right-eye image data SR. The left-eye image data SL and the right-eye image data SR are supplied to the superimposer unit 212.

The subtitle elementary stream extracted in the demultiplexer 203 is supplied to the subtitle decoder 206. The subtitle decoder 206 performs the decoding to the encoded subtitle data included in the subtitle elementary stream to acquire decoded subtitle data. The subtitle data is supplied to the subtitle generator 207. The subtitle generator 207 generates subtitle display data to be superimposed on an image on the basis of the subtitle data. The subtitle display data is supplied to the superimposer unit 212.

In addition, the subtitle decoder 206 acquires a variety of information concerning the subtitle disparity data included in the 3D segment (3DS). This information is supplied to the disparity data output unit 210. For example, the subtitle decoder 206 acquires the information in "disparity_static_supply" indicating whether the fixed disparity data for every region/display set is supplied from the 3D segment. The subtitle decoder 206 acquires the information in "disparity_sequence_supply from the 3D segment. This information indicates whether the disparity sequence for every region/display set is supplied, as described above.

The disparity elementary stream extracted in the demultiplexer 203 is supplied to the disparity data decoder 208. The disparity data decoder 208 performs the decoding to the encoded disparity data included in the disparity elementary stream to acquire decoded disparity data. The disparity data decoder 208 acquires the disparity data only when either of the general-purpose disparity data and the specific-purpose disparity data (multiple pieces of disparity data sequentially updated in the frame period including frames of the certain number) or both thereof are transmitted. The disparity data is supplied to the disparity data output unit 210.

The metadata processor 209 processes the stereoscopic descriptor (refer to FIGS. 5 and 6) and the disparity link descriptor (refer to FIGS. 7 and 8) incorporated in the EIT supplied from the demultiplexer 203 to acquire a variety of information concerning the disparity data. For example, the metadata processor 209 acquires the information in "event_disparity_supply" indicating whether the disparity data for every program is transmitted from the stereoscopic descriptor. The metadata processor 209 acquires the information in "detailed_disparity_supply" indicating whether the detailed disparity data is transmitted from the stereoscopic descriptor. When the identification information for every program is transmitted, the metadata processor 209 also acquires the identification information for every program because the identification information for every program is included in the stereoscopic descriptor.

In addition, for example, the metadata processor 209 acquires the information in "general_use_disparity_flag" indicating whether the general-purpose disparity data is transmitted from the disparity link descriptor. The metadata processor 209 acquires the information in "subtitle_disparity_flag" indicating whether the subtitle disparity data is transmitted from the disparity link descriptor. The metadata processor 209 acquires the information in "disparity_component" from the disparity link descriptor. The information in "disparity_component" indicates the value of a component tag (component_tag) indicating the disparity stream including the disparity data. The packet identification (PID) of the disparity stream can be acquired on the basis of the value of the component tag. The variety of information acquired in the metadata processor 209 is supplied to the disparity data output unit 210.

The disparity data output unit 210 determines the disparity data to be used on the basis of the disparity data from the disparity data decoder 208, the variety of information concerning the disparity data from the subtitle decoder 206, and the variety of information concerning the disparity data from the metadata processor 209 to output the determined disparity data.

For example, when the superimposed information is an OSD image, the following disparity data is output. Specifically, when the general-purpose disparity data is transmitted, the general-purpose disparity data is determined to be the disparity data to be used and is output. When the general-purpose disparity data is not transmitted but the disparity data for every program is transmitted, the disparity data for every program is determined to be the disparity data to be used and is output. When neither of the general-purpose disparity data and the disparity data for every program is transmitted, the disparity data prepared in advance in the receiver apparatus 200 is determined to be the disparity data to be used and is output.

For example, when the superimposed information is a subtitle, the following disparity data is output. Specifically, when the disparity sequence for every region/display set is transmitted, the disparity sequence for every region/display set is determined to be the disparity data to be used and is output. When the disparity sequence is not transmitted but the fixed disparity data for every region/display set is transmitted, the fixed disparity data is determined to be the disparity data to be used and is output.

When the disparity data for every region/display set is not transmitted but the disparity data for every program is transmitted, the disparity data for every program is determined to be the disparity data to be used and is output. When neither of the disparity data for every region/display set and the disparity data for every program is transmitted, the disparity data prepared in advance in the receiver apparatus 200 is determined to be the disparity data to be used and is output.

The disparity data, which is determined in the disparity data output unit 210 in the above manner and is output from the disparity data output unit 210, is supplied to the superimposer unit 212. The superimposer unit 212 superimposes the subtitle display data generated in the subtitle generator 207 and/or the OSD data generated in the OSD data generator 211 on the left-eye image data and the right-eye image data acquired in the 3D signal processor 205. In this case, the superimposer unit 212 performs the shifting process to the superimposed information (the subtitle and/or the OSD image) displayed on the left-eye image and the right-eye image on the basis of the disparity data supplied from the disparity data output unit 210 to add the disparity.

The left-eye image data SL' on which the subtitle and/or the OSD image is superimposed and the right-eye image data SR' on which the subtitle and/or the OSD image is superimposed are alternately output from the superimposer unit 212. The left-eye image data SL' and the right-eye image data SR' are supplied to the display unit 213. The display unit 213 alternately displays the image generated from the left-eye image data SL' and the image generated from the right-eye image data SR'. The left-eye image and the right-eye image displayed in the display unit 213 in the above manner are perceived by the viewer wearing shutter glasses (not shown) with his/her left and right eyes and the viewer recognizes a stereoscopic image.

In this case, the disparity is added to the superimposed information (the subtitle and/or the OSD image) to be superimposed on the left-eye image and the right-eye image on the basis of the disparity data, as described above. Accordingly, the superimposed information is recognized by the viewer at a position closer than the closest position of the image. The depth of the superimposed information is determined by the disparity data that is used.

Figure 24:
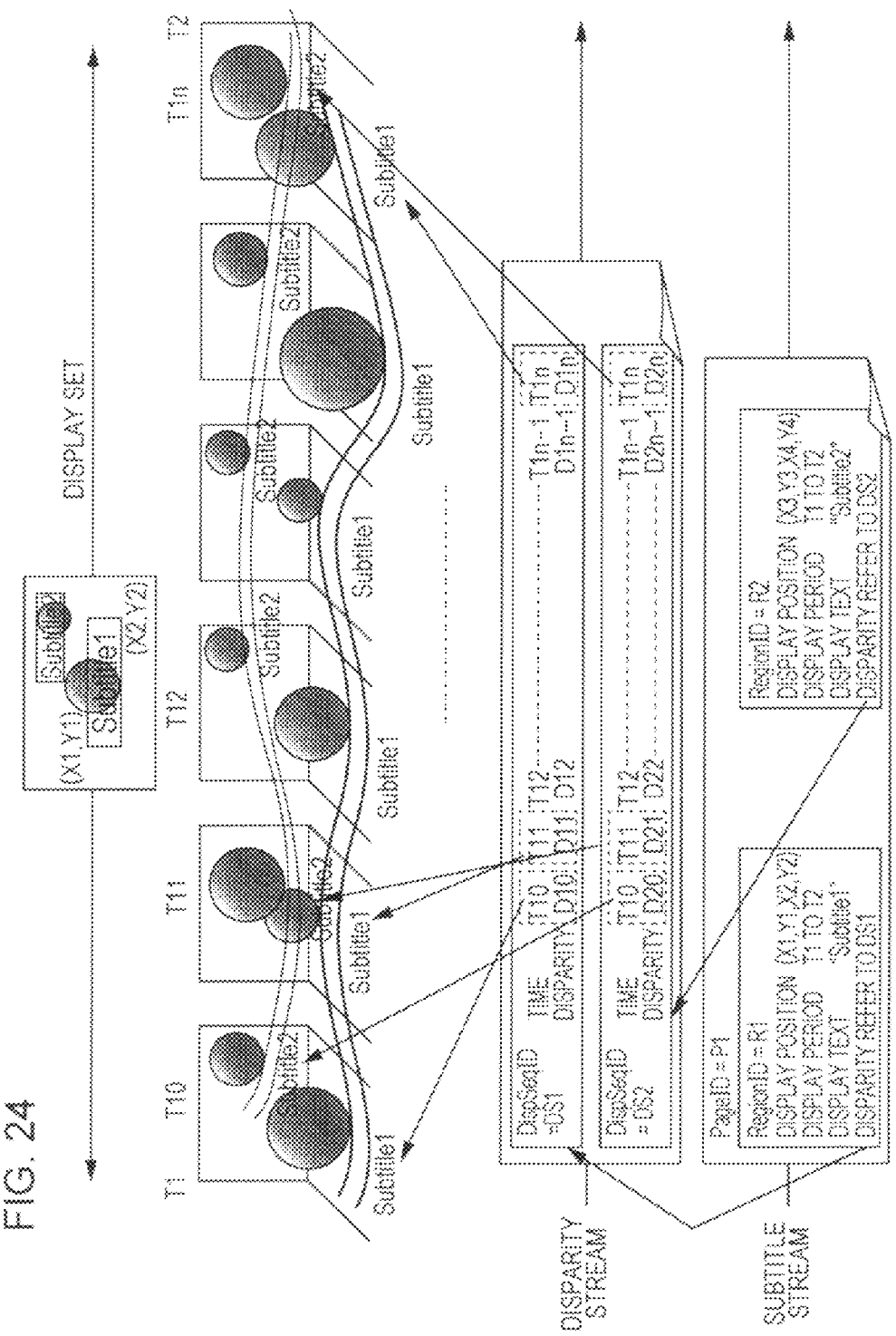
FIG. 24 shows an example of how subtitles are three-dimensionally displayed when disparity is added to the subtitles to be superimposed on a left-eye image and a right-eye image on the basis of a disparity sequence for every region/display set.

FIG. 24 shows an example of how subtitles are three-dimensionally displayed. In this example, the disparity sequence for every region/display set is transmitted and the disparities are added to the subtitles to be superimposed on the left-eye image and the right-eye image on the basis of the disparity sequence.

In the example in FIG. 24, a subtitle "Subtitle 1" is displayed in a region (Region ID=R1) and a subtitle "Subtitle 2" is displayed in a region (Region ID=R2) in a certain page (Page ID=P1). The region (Region ID=R1) is displayed at a position (X1,Y1,X2,Y2) in display sets T1 to T2 and has a display text "Subtitle 1." The region (Region ID=R2) is displayed at a position (X3,Y3,X4,Y4) in the display sets T1 to T2 and has a display text "Subtitle 2."

The disparity sequence in "disparity_sequence_id=DS1" included in the disparity stream is referred to in order to add the disparity to the subtitle "Subtitle 1" in the example in FIG. 24. This disparity sequence includes pieces of disparity data D10, D11, D12, . . . , D1n corresponding to times T10, T11, T12, . . . , T1n in the display set.

The disparity sequence in "disparity_sequence_id=DS2" included in the disparity stream is referred to in order to add the disparity to the subtitle "Subtitle 2" in the example in FIG. 24. This disparity sequence includes pieces of disparity data D20, D21, D22, . . . , D2n corresponding to the times T10, T11, T12, . . . , T1n in the display set.

The disparities are added to the subtitles "Subtitle 1" and "Subtitle 2" to be superimposed on the left-eye image and the right-eye image on the basis of the disparity sequences in "disparity_sequence_id=DS1" and "disparity_sequence_id=DS2" in the example in FIG. 24. In this case, the disparities that are constantly varied with the variation in the content of the image in the display set are added to the subtitles "Subtitle 1" and "Subtitle 2." Accordingly, the depth of each of the subtitles "Subtitle 1" and "Subtitle 2" recognized by the viewer is constantly varied with the variation in the content of the image in the display set.

Figure 25:
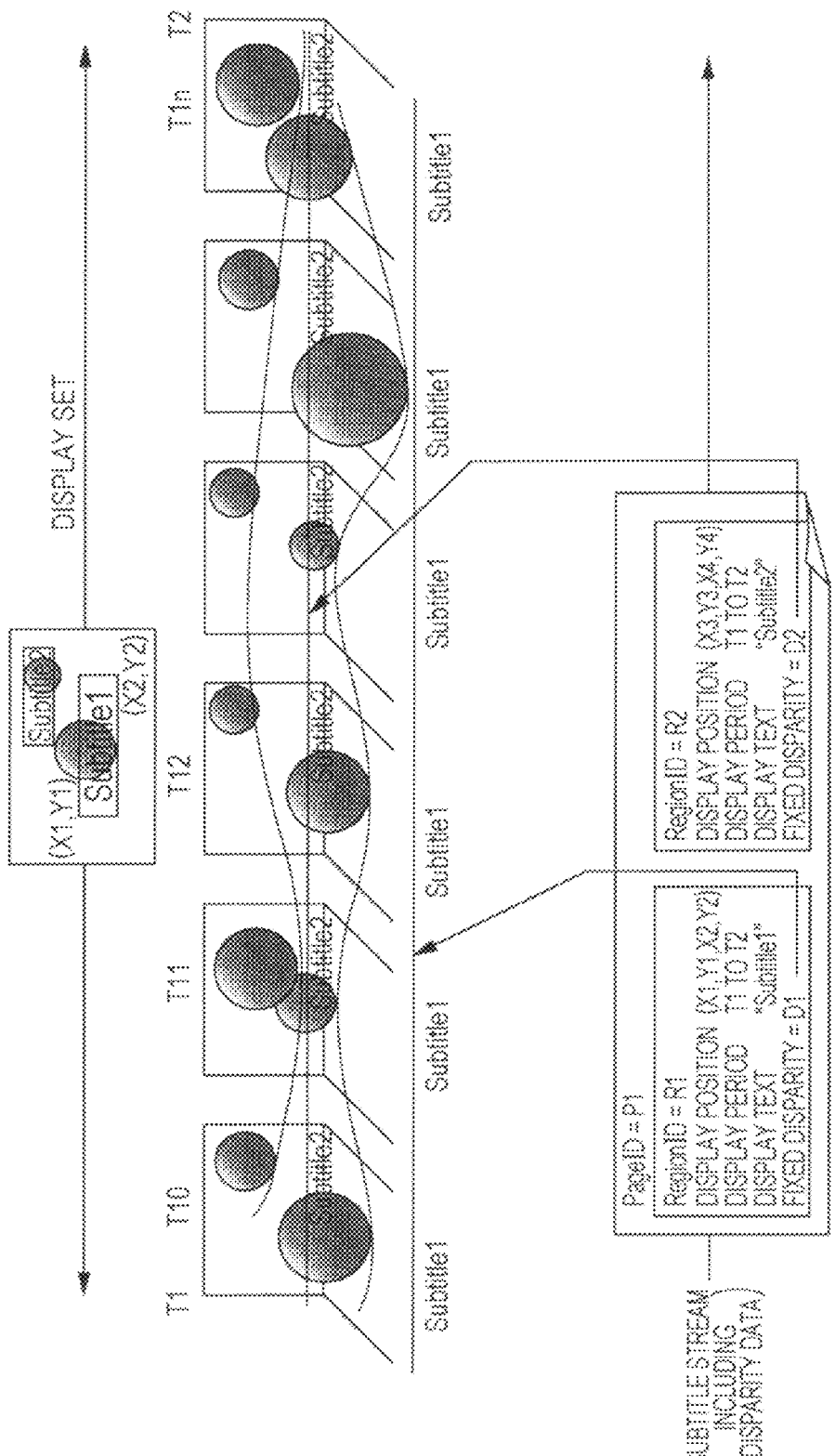
FIG. 25 shows an example of how the subtitles are three-dimensionally displayed when the disparity is added to the subtitles to be superimposed on the left-eye image and the right-eye image on the basis of fixed disparity data for every region/display set.

FIG. 25 shows another example of how the subtitles are three-dimensionally displayed. In this example, the fixed disparity data for every region/display set is transmitted and the disparities are added to the subtitles to be superimposed on the left-eye image and the right-eye image on the basis of the fixed disparity data.

In the example in FIG. 25, the subtitle "Subtitle 1" is displayed in the region (Region ID=R1) and the subtitle "Subtitle 2" is displayed in the region (Region ID=R2) in the certain page (Page ID=P1). The region (Region ID=R1) is displayed at the position (X1,Y1,X2,Y2) in the display sets T1 to T2 and has the display text "Subtitle 1." The region (Region ID=R2) is displayed at the position (X3,Y3,X4,Y4) in the display sets T1 to T2 and has the display text "Subtitle 2."

Fixed disparity data (fixed_disparity=D1) included in the subtitle stream is used in order to add the disparity to the subtitle "Subtitle 1" in the example in FIG. 25. Fixed disparity data (fixed_disparity=D2) included in the subtitle stream is used in order to add the disparity to the subtitle "Subtitle 2" in the example in FIG. 25.

The fixed disparities are added to the subtitles "Subtitle 1" and "Subtitle 2" to be superimposed on the left-eye image and the right-eye image in the display set on the basis of the fixed disparity data (fixed_disparity=D1, D2) in the example in FIG. 25. Accordingly, the depth of each of the subtitles "Subtitle 1" and "Subtitle 2" recognized by the viewer is constant in the display set.

Figure 26:
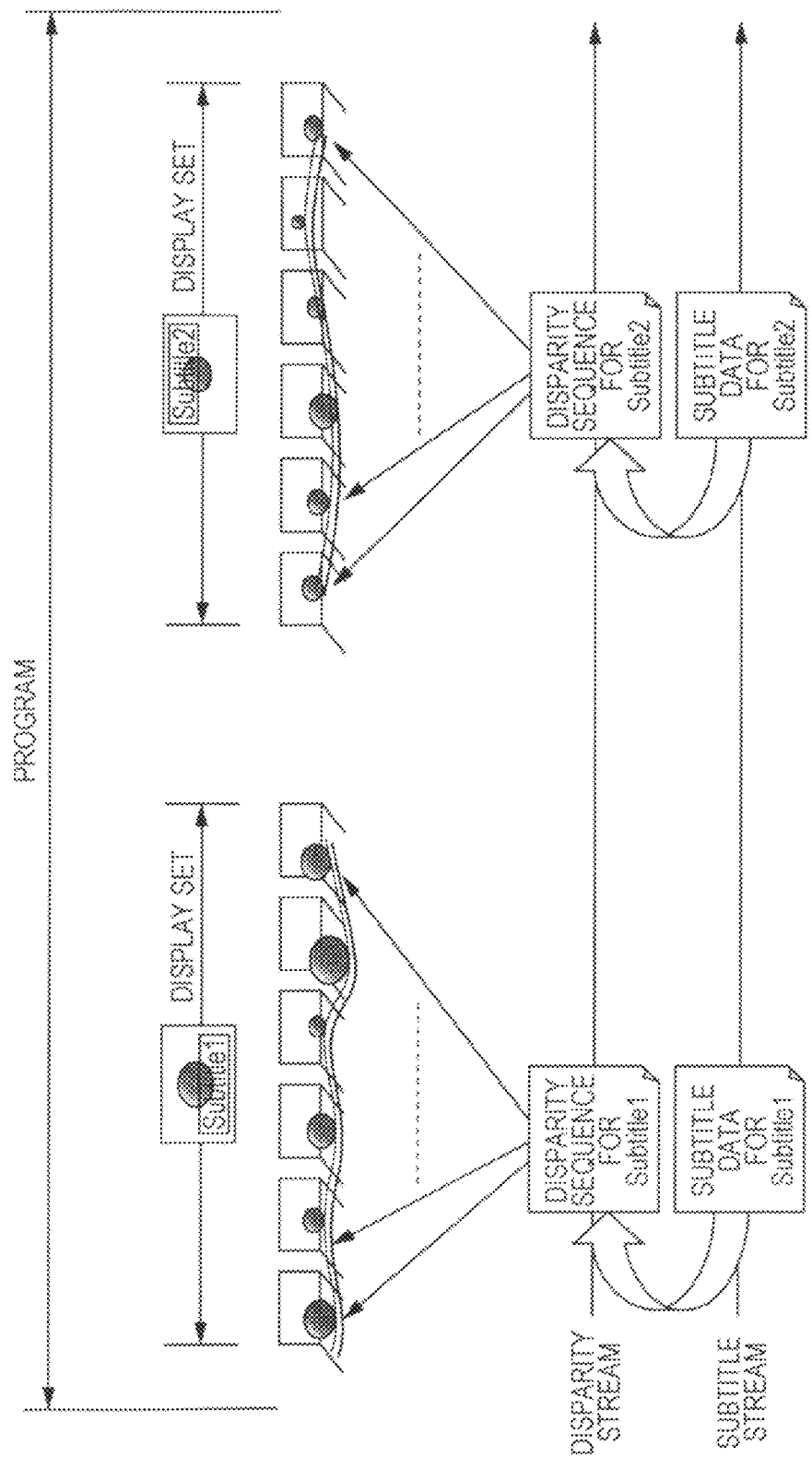
FIG. 26 shows another example of how subtitles are three-dimensionally displayed when the disparity is added to the subtitles to be superimposed on the left-eye image and the right-eye image on the basis of the disparity sequence for every region/display set.

FIG. 26 shows another example of how the subtitles are three-dimensionally displayed. In this example, the disparity sequence for every region/display set is transmitted and the disparities are added to the subtitles to be superimposed on the left-eye image and the right-eye image on the basis of the disparity sequence.

In the example in FIG. 26, the subtitle "Subtitle 1" is displayed in a first region in a first display set and the subtitle "Subtitle 2" is displayed in a second region in a second display set. The disparity sequence to add the disparity to the subtitle "Subtitle 1", included in the disparity stream, is referred to in order to add the disparity to the subtitle "Subtitle 1." The disparity sequence to add the disparity to the subtitle "Subtitle 2", included in the disparity stream, is referred to in order to add the disparity to the subtitle "Subtitle 2."

The disparities that are constantly varied with the variation in the content of the images in the respective display sets are added to the subtitles "Subtitle 1" and "Subtitle 2" to be superimposed on the left-eye image and the right-eye image in the first display set and the second display set on the basis of the disparity sequences in the example in FIG. 26. Accordingly, the depth of each of the subtitles "Subtitle 1" and "Subtitle 2" recognized by the viewer is constantly varied with the variation in the content of the image in the corresponding display set.

Figure 27:
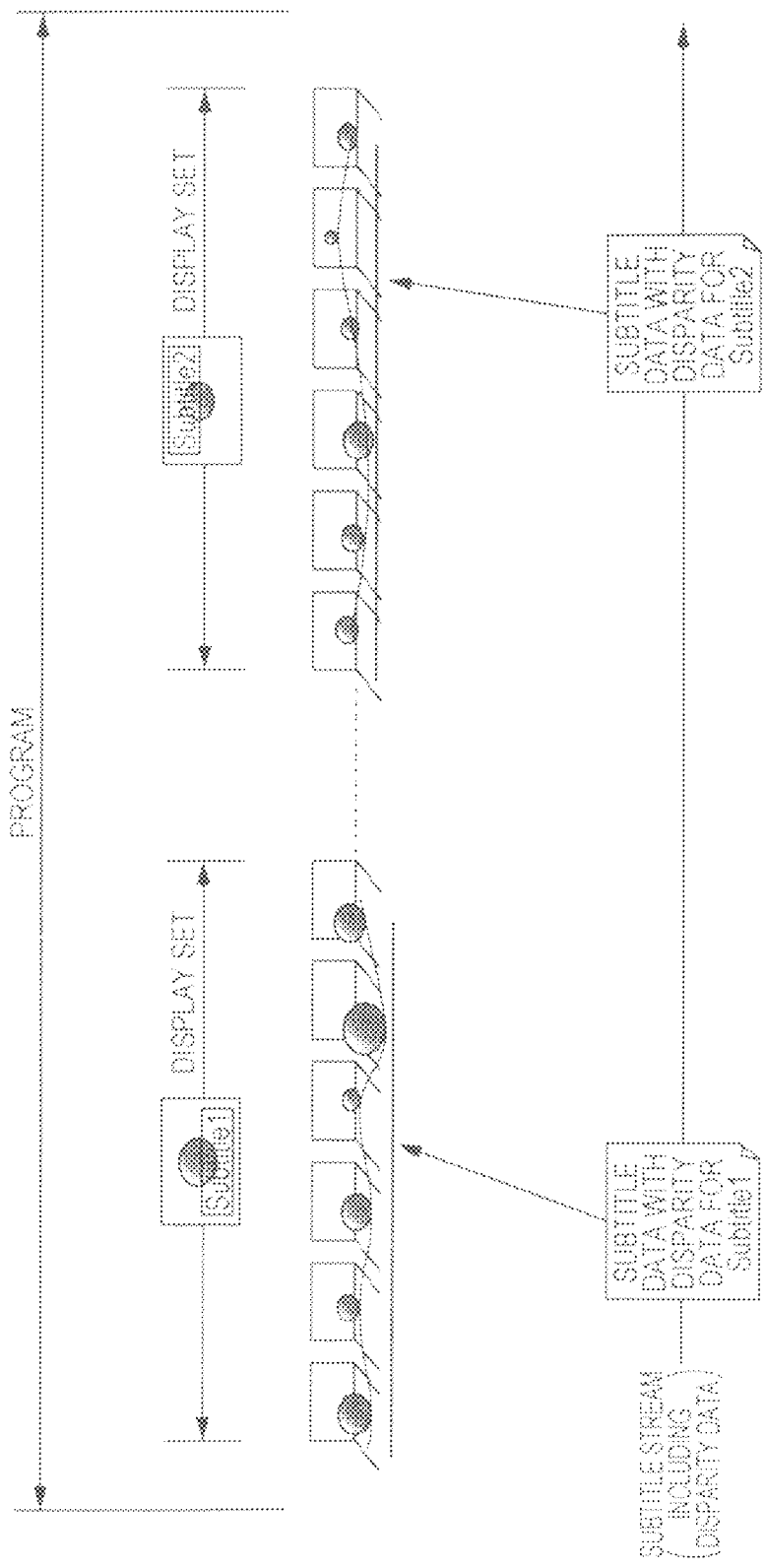
FIG. 27 shows another example of how the subtitles are three-dimensionally displayed when the disparity is added to the subtitles to be superimposed on the left-eye image and the right-eye image on the basis of the fixed disparity data for every region/display set.

FIG. 27 shows another example of how the subtitles are three-dimensionally displayed. In this example, the fixed disparity data for every region/display set is transmitted and the disparities are added to the subtitles to be superimposed on the left-eye image and the right-eye image on the basis of the fixed disparity data.

In the example in FIG. 27, the subtitle "Subtitle 1" is displayed in a first region in a first display set and the subtitle "Subtitle 2" is displayed in a second region in a second display set. The fixed disparity data to add the disparity to the subtitle "Subtitle 1", included in the subtitle stream, is used in order to add the disparity to the subtitle "Subtitle 1." The fixed disparity data to add the disparity to the subtitle "Subtitle 2", included in the subtitle stream, is used in order to add the disparity to the subtitle "Subtitle 2."

The fixed disparities are added to the subtitles "Subtitle 1" and "Subtitle 2" to be superimposed on the left-eye image and the right-eye image in the first display set and the second display set in the respective display sets on the basis of the respective pieces of fixed disparity data in the example in FIG. 27. Accordingly, the depth of each of the subtitles "Subtitle 1" and "Subtitle 2" recognized by the viewer is constant in the corresponding display set.

Figure 28:
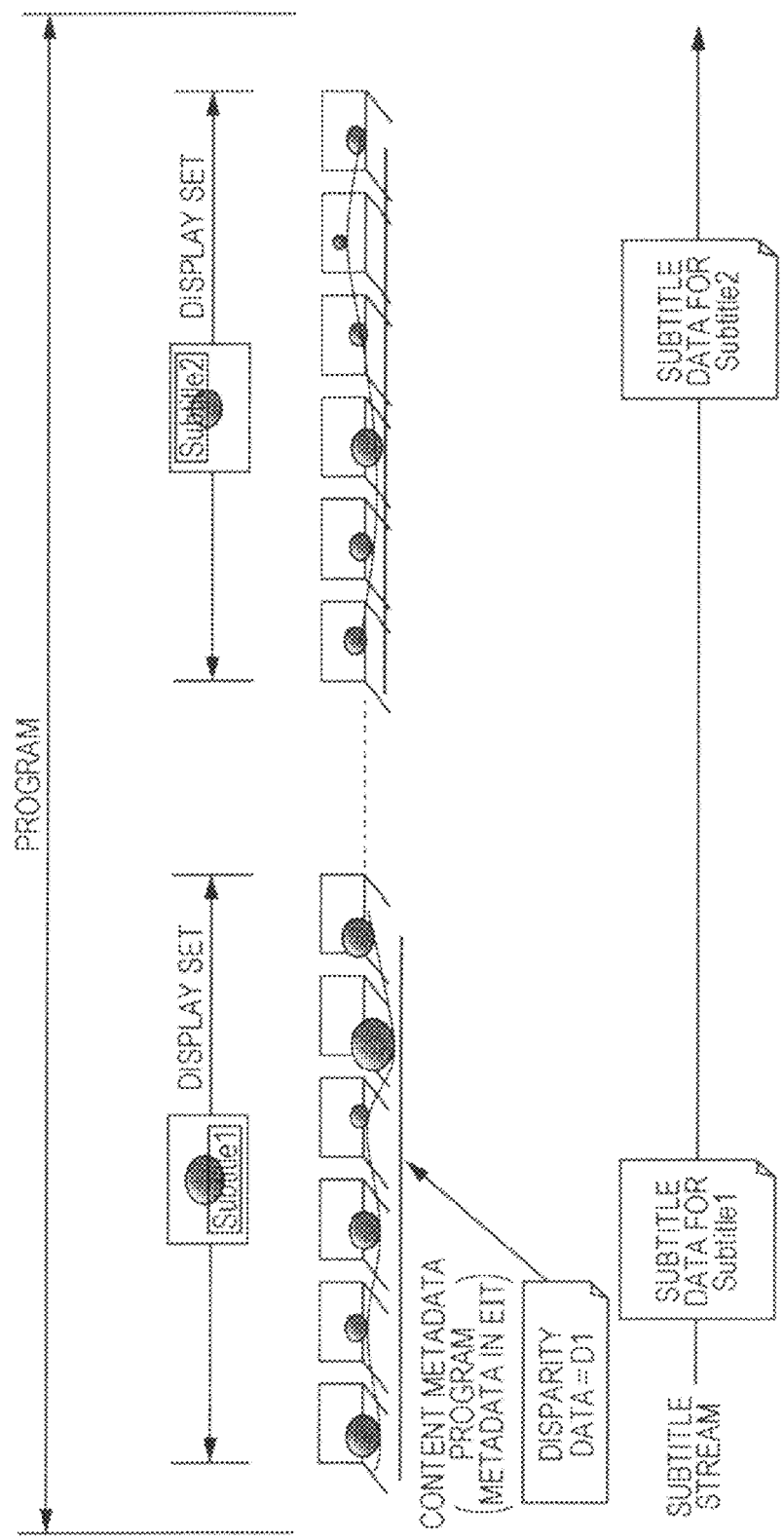
FIG. 28 shows an example of how the subtitles are three-dimensionally displayed when the disparity is added to the subtitles to be superimposed on the left-eye image and the right-eye image on the basis of disparity data for every program.

FIG. 28 shows another example of how the subtitles are three-dimensionally displayed. In this example, the disparity data for every program is transmitted and the disparity is added to the subtitles to be superimposed on the left-eye image and the right-eye image on the basis of the disparity data for every program.

In the example in FIG. 28, the subtitle "Subtitle 1" is displayed in a first region in a first display set in a program and the subtitle "Subtitle 2" is displayed in a second region in a second display set in the program. Disparity data (D1) for every program included in the stereoscopic descriptor (stereoscopic_descriptor) in the EIT is used in order to add the disparity to the subtitles "Subtitle 1" and "Subtitle 2."

The fixed disparity is added to the subtitles "Subtitle 1" and "Subtitle 2" to be superimposed on the left-eye image and the right-eye image in the program on the basis of the disparity data (D1) for every program in the example in FIG. 28. Accordingly, the depth of each of the subtitles "Subtitle 1" and "Subtitle 2" recognized by the viewer is constant in the program.

Figure 29:
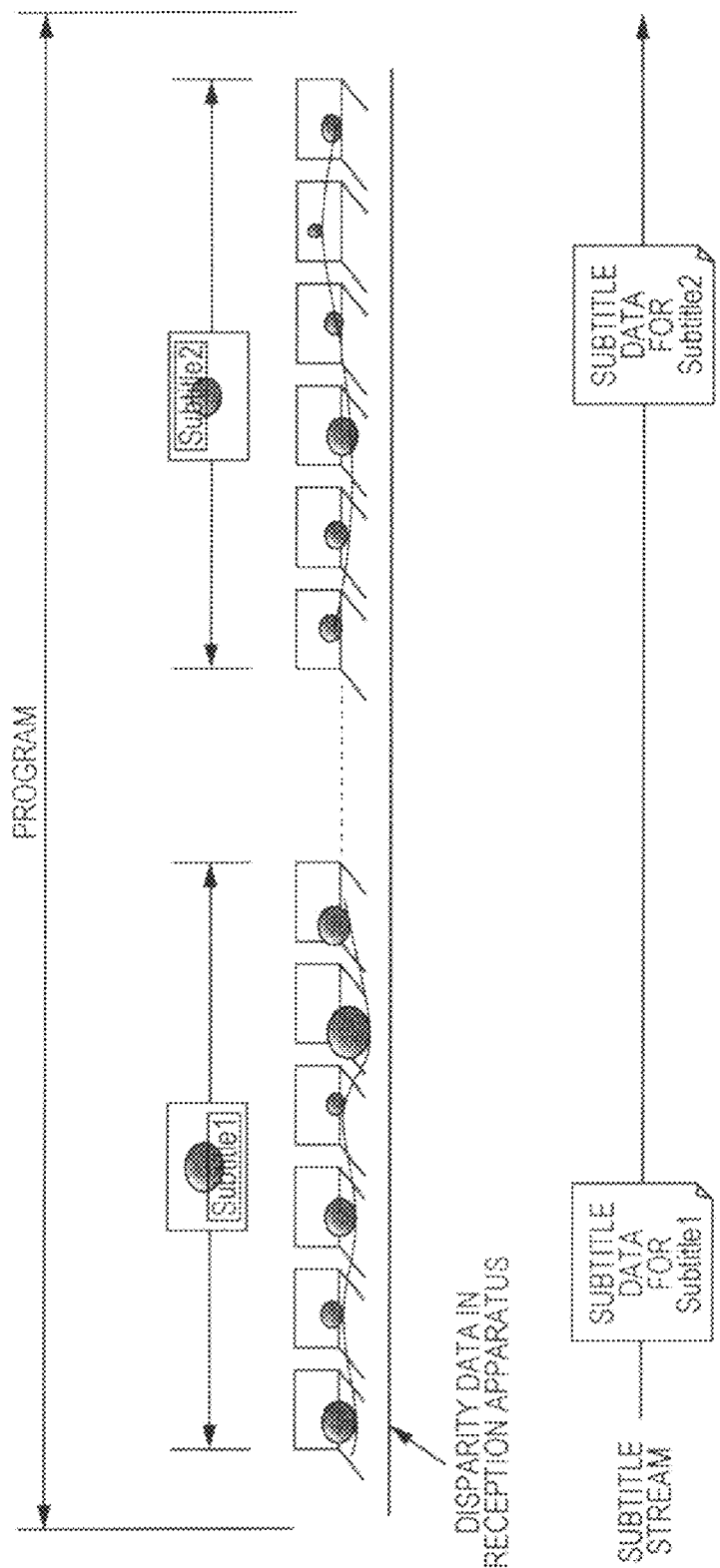
FIG. 29 shows an example of how the subtitles are three-dimensionally displayed when the disparity is added to the subtitles to be superimposed on the left-eye image and the right-eye image on the basis of disparity data prepared in advance in the receiver apparatus.
Figure 30:
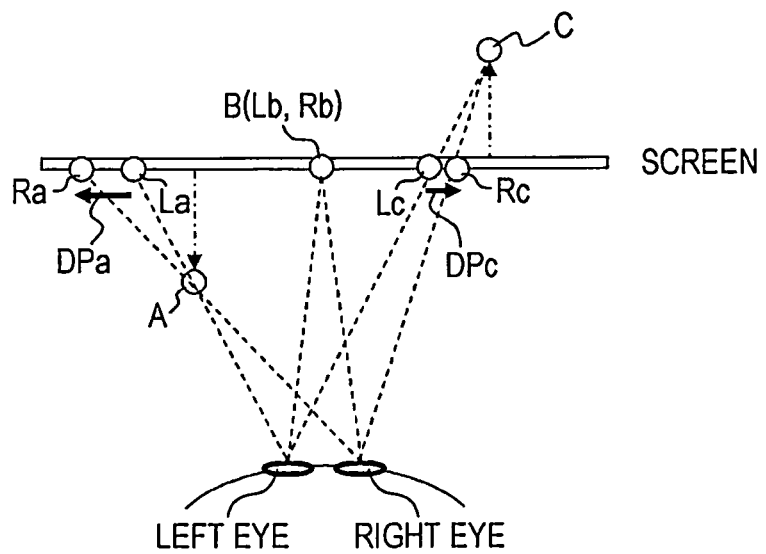
FIG. 30 illustrates examples of the relationship between positions where left and right images of objects are displayed on a screen and positions where stereoscopic images (three-dimensional (3D) images) of the objects are reproduced in display of the stereoscopic images using binocular disparity.
Figure 31:
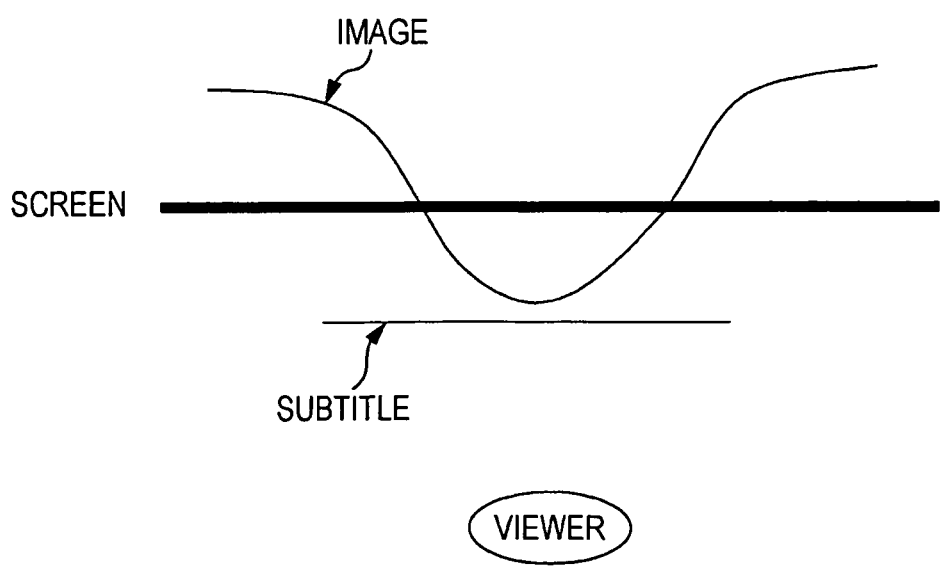
FIG. 31 illustrates an example of the positional relationship between an image and a caption when the caption is recognized at a position closer than the closest position of the image.

FIG. 29 shows another example of how the subtitles are three-dimensionally displayed. In this example, no disparity data is transmitted and the disparity is added to the subtitles to be superimposed on the left-eye image and the right-eye image on the basis of the disparity data prepared in advance in the receiver apparatus 200.

In the example in FIG. 29, the subtitle "Subtitle 1" is displayed in a first region in a first display set in a program and the subtitle "Subtitle 2" is displayed in a second region in a second display set in the program. The disparity data prepared in advance in the receiver apparatus 200 is used in order to add the disparity to the subtitles "Subtitle 1" and "Subtitle 2."

The fixed disparity is added to the subtitles "Subtitle 1" and "Subtitle 2" to be superimposed on the left-eye image and the right-eye image, for example, in the program on the basis of the disparity data prepared in advance in the receiver apparatus 200 in the example in FIG. 29. Accordingly, the depth of each of the subtitles "Subtitle 1" and "Subtitle 2" recognized by the viewer is constant in the program.

Referring back to FIG. 20, the audio elementary stream extracted in the demultiplexer 203 is supplied to the audio decoder 214. The audio decoder 214 performs the decoding to the encoded audio data included in the audio elementary stream to acquire decoded audio data. The audio data is supplied to the audio processor circuit 215. The audio processor circuit 215 performs necessary processing, such as the D/A conversion, to the audio data. The audio data subjected to the processing is amplified in the audio amplifier circuit 216 and the amplified audio data is supplied to the speaker 217. The speaker 217 outputs the audio corresponding to the image displayed in the display unit 213.

As described above, in the stereoscopic image transmission-reception system 10 shown in FIG. 1, the transmission data generating unit 110 in the broadcast station 100 (refer to FIG. 2) incorporates the identification information indicating whether the disparity data is transmitted in the transport stream TS including the stereoscopic image data about a certain program. Accordingly, it is possible to improve the flexibility of the transmission of the disparity data by the 3D video content supplier. In other words, it is possible to selectively transmit the disparity data for every program, the general-purpose disparity data, the subtitle disparity data, and so on as the disparity data. In addition, no transmission of the disparity data may be selected.

In the stereoscopic image transmission-reception system 10 shown in FIG. 1, the receiver apparatus 200 (refer to FIG. 20) acquires the identification information indicating whether the disparity data is transmitted, incorporated in the transport stream TS. The disparity based on certain disparity data, such as the disparity data for every program, the general-purpose disparity data, and the subtitle disparity data, is added to the same superimposed information (the subtitle and/or the OSD image) to be superimposed on the left-eye image and the right-eye image on the basis of the identification information. Accordingly, it is possible to display the superimposed information, such as the subtitle and/or the OSD image, on the stereoscopic image at a depth intended by the 3D video content supplier.

<Modifications>

The stereoscopic descriptor (stereoscopic_descriptor) and the disparity link descriptor (disparity_link_descriptor) are incorporated in the EIT in the above embodiments. However, the position where these descriptors are incorporated is not limited to the EIT. For example, the stereoscopic descriptor may be incorporated in the EIT and the disparity link descriptor may be incorporated in the PMT. Both of the stereoscopic descriptor and the disparity link descriptor may be incorporated in the PMT. Alternatively, these descriptors may be incorporated in another position.

The receiver apparatus 200 automatically determines the disparity data to be used on the basis of the type of the disparity data that is transmitted, as described above with reference to the flowcharts in FIGS. 21 and 22, in the above embodiments. However, the disparity data to be used may be arbitrarily determined in response to a user's operation.

Although the subtitle is used as the specific superimposed information in the above embodiments, another superimposed information, such as a closed caption, may be used in the same manner. The transport stream TS including the stereoscopic image data is broadcasted from the broadcast station 100 in the above embodiments. However, the present invention is applicable to a system in which the transport stream TS is delivered to a reception terminal over a network, such as the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus of transmitting stereoscopic image data comprising:
    an image data output unit configured to output stereoscopic image data including left-eye image data and right-eye image data about a certain program; and
    an image data transmitting unit configured to transmit a transport stream including the stereoscopic image data about the certain program output from the image data output unit,
    wherein the image data transmitting unit incorporates identification information indicating whether disparity data from a number of predetermined types is transmitted in the transport stream, the disparity data being used to add disparity to superimposed information to be superimposed on an image generated from the left-eye image data and the right-eye image data,
    in which the number of predetermined types include general-purpose disparity data and specific-purpose disparity data and in which the identification information is incorporated in an event information table (EIT) portion of the transport stream, such that the identification information in the EIT portion of the transport stream indicates whether or not general-purpose disparity data is transmitted in the transport stream and whether or not specific-purpose disparity data is transmitted in the transport stream.

2. The apparatus of transmitting stereoscopic image data according to claim 1,
wherein the number of predetermined types further includes every program disparity data such that the identification information indicates whether disparity data for every program is transmitted.

3. The apparatus of transmitting stereoscopic image data according to claim 2,
wherein, when the identification information indicates that the disparity data for every program is transmitted, the image data transmitting unit further incorporates the disparity data for every program in the transport stream.

4. An apparatus of transmitting stereoscopic image data comprising:
an image data output unit configured to output stereoscopic image data including left-eye image data and right-eye image data about a certain program; and
an image data transmitting unit configured to transmit a transport stream including the stereoscopic image data about the certain program output from the image data output unit,
wherein the image data transmitting unit incorporates identification information indicating whether disparity data is transmitted in the transport stream, the disparity data being used to add disparity to superimposed information to be superimposed on an image generated from the left-eye image data and the right-eye image data,
wherein the identification information indicates whether general-purpose disparity data is transmitted, and
wherein, when the identification information indicates that the general-purpose disparity data is transmitted, the image data transmitting unit further incorporates a disparity elementary stream including the general-purpose disparity data in the transport stream and incorporates identification information identifying the disparity elementary stream in the transport stream in association with the identification information indicating that the general-purpose disparity data is transmitted.

5. An apparatus of transmitting stereoscopic image data comprising:
an image data output unit configured to output stereoscopic image data including left-eye image data and right-eye image data about a certain program; and
an image data transmitting unit configured to transmit a transport stream including the stereoscopic image data about the certain program output from the image data output unit,
wherein the image data transmitting unit incorporates identification information indicating whether disparity data is transmitted in the transport stream, the disparity data being used to add disparity to superimposed information to be superimposed on an image generated from the left-eye image data and the right-eye image data,
wherein the identification information indicates whether disparity data for specific superimposed information is transmitted, and
wherein, when the identification information indicates that the disparity data for specific superimposed information is transmitted, the image data transmitting unit further incorporates fixed-varied information in the transport stream, the fixed-varied information indicating either of transmission of disparity data that is commonly used in a frame period including frames of a certain number in which the specific superimposed information is displayed and transmission of disparity data that is sequentially updated in the frame period including frames of the certain number or both thereof.

6. The apparatus of transmitting stereoscopic image data according to claim 5,
wherein the image data transmitting unit incorporates a superimposed information elementary stream including data about the specific superimposed information in the transport stream, and
wherein the fixed-varied information is incorporated in the superimposed information elementary stream for every piece of superimposed information.

7. The apparatus of transmitting stereoscopic image data according to claim 6,
wherein, when the fixed-varied information indicates the transmission of the disparity data that is commonly used in the frame period including frames of the certain number, the image data transmitting unit incorporates the disparity data that is commonly used in the frame period including frames of the certain number in the superimposed information elementary stream for every piece of superimposed information in association with the fixed-varied information.

8. The apparatus of transmitting stereoscopic image data according to claim 6,
wherein, when the fixed-varied information indicates the transmission of the disparity data that is sequentially updated in the frame period including frames of the certain number in which the specific superimposed information is displayed, the image data transmitting unit incorporates the superimposed information elementary stream in which a disparity sequence for every piece of superimposed information is discriminated with the identification information in the transport stream and incorporates the identification information specifying the corresponding disparity sequence in the disparity elementary stream in the superimposed information elementary stream for every piece of superimposed information in accordance with the fixed-varied information.

9. A method of transmitting stereoscopic image data comprising the steps of:
sequentially outputting stereoscopic image data including left-eye image data and right-eye image data about each program; and
transmitting a transport stream including the stereoscopic image data about each program sequentially output in the image data outputting step,
wherein the image data transmitting step incorporates identification information indicating whether disparity data from a number of predetermined types is transmitted in the transport stream, the disparity data being used to add disparity to superimposed information to be superimposed on an image generated from the left-eye image data and the right-eye image data,
in which the number of predetermined types include general-purpose disparity data and specific-purpose disparity data and in which the identification information is incorporated in an event information table (EIT) portion of the transport stream, such that the identification information in the EIT portion of the transport stream indicates whether or not general-purpose disparity data is transmitted in the transport stream and whether or not specific-purpose disparity data is transmitted in the transport stream.

10. An apparatus of receiving stereoscopic image data comprising:
an image data receiving unit configured to receive a transport stream in which stereoscopic image data including left-eye image data and right-eye image data about a certain program is included and in which identification information indicating whether disparity data from a number of predetermined types is transmitted is incorporated, the disparity data being used to add disparity to superimposed information to be superimposed on an image generated from the left-eye image data and the right-eye image data, in which the number of predetermined types include general-purpose disparity data and specific-purpose disparity data and in which the identification information is incorporated in an event information table (EIT) portion of the transport stream, such that the identification information in the EIT portion of the transport stream indicates whether or not general-purpose disparity data is transmitted in the transport stream and whether or not specific-purpose disparity data is transmitted in the transport stream;

an image data acquiring unit configured to acquire the stereoscopic image data from the transport stream received by the image data receiving unit;

an identification information acquiring unit configured to acquire the identification information from the transport stream received by the image data receiving unit; and an image data processing unit configured to add the disparity based on certain disparity data to the same superimposed information to be superimposed on an left-eye image and a right-eye image on the basis of the stereoscopic image data acquired by the image data acquiring unit and the identification information acquired by the identification information acquiring unit to acquire left-eye image data on which the superimposed information is superimposed and right-eye image data on which the superimposed information is superimposed.

11. The apparatus of receiving stereoscopic image data according to claim 10,
wherein the number of predetermined types further includes every program disparity data such that the identification information indicates whether disparity data for every program is transmitted.

12. The apparatus of receiving stereoscopic image data according to claim 10,
wherein, when the identification information indicates that the disparity data is transmitted, the image data processing unit uses the disparity data acquired from the transport stream as the certain disparity data.

13. The apparatus of receiving stereoscopic image data according to claim 10,
wherein, when the identification information indicates that no disparity data is transmitted, the image data processing unit uses disparity data that is prepared in advance as the certain disparity data.

14. A method of receiving stereoscopic image data comprising the steps of:
receiving a transport stream in which stereoscopic image data including left-eye image data and right-eye image data about a certain program is included and in which identification information indicating whether disparity data from a number of predetermined types is transmitted is incorporated, the disparity data being used to add disparity to superimposed information to be superimposed on an image generated from the left-eye image data and the right-eye image data, in which the number of predetermined types include general-purpose disparity data and specific-purpose disparity data and in which the identification information is incorporated in an event information table (EIT) portion of the transport stream, such that the identification information in the EIT portion of the transport stream indicates whether or not general-purpose disparity data is transmitted in the transport stream and whether or not specific-purpose disparity data is transmitted in the transport stream;
acquiring the stereoscopic image data from the transport stream received in the image data receiving step;
acquiring the identification information from the transport stream received in the image data receiving step; and
adding the disparity based on certain disparity data to the same superimposed information to be superimposed on an left-eye image and a right-eye image on the basis of the stereoscopic image data acquired in the image data acquiring step and the identification information acquired in the identification information acquiring step to acquire left-eye image data on which the superimposed information is superimposed and right-eye image data on which the superimposed information is superimposed.

15. The apparatus of transmitting stereoscopic image data according to claim 2, in which the EIT portion of the transport stream includes a stereoscopic descriptor and a disparity link descriptor, and in which the identification information pertaining to the general-purpose disparity data and specific-purpose disparity data is incorporated in the disparity link descriptor and the identification information pertaining to the every program disparity is incorporated in the stereoscopic descriptor.

* * * * *